United States Patent
Bonnet et al.

(10) Patent No.: US 8,489,388 B2
(45) Date of Patent: Jul. 16, 2013

(54) DATA DETECTION

(75) Inventors: Olivier Bonnet, Paris (FR); Frederick de Jaeger, Paris (FR); Romain Goyet, Paris (FR); Jean-Pierre Ciudad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1222 days.

(21) Appl. No.: 12/268,410

(22) Filed: Nov. 10, 2008

(65) Prior Publication Data

US 2010/0121631 A1    May 13, 2010

(51) Int. Cl.
  *G06F 17/27*    (2006.01)
(52) U.S. Cl.
  USPC ............... 704/9; 707/755; 717/143; 717/144
(58) Field of Classification Search
  None
  See application file for complete search history.

(56) References Cited

U.S. PATENT DOCUMENTS

| | | |
|---|---|---|
| 4,227,245 A | 10/1980 | Edblad et al. |
| 4,791,556 A | 12/1988 | Vilkaitis |
| 4,818,131 A | 4/1989 | Sakai |
| 4,873,662 A | 10/1989 | Sargent |
| 4,907,285 A | 3/1990 | Nakano et al. |
| 4,965,763 A | 10/1990 | Zamora |
| 5,034,916 A | 7/1991 | Ordish |
| 5,146,406 A | 9/1992 | Jensen |
| 5,155,806 A | 10/1992 | Hoeber et al. |
| 5,157,736 A | 10/1992 | Boyer et al. |
| 5,182,709 A | 1/1993 | Makus |
| 5,189,632 A | 2/1993 | Paajanen et al. |
| 5,283,856 A | 2/1994 | Gross et al. |
| 5,299,261 A | 3/1994 | Bogart et al. |
| 5,301,350 A | 4/1994 | Rogan et al. |
| 5,346,516 A | 9/1994 | Alkhas et al. |
| 5,369,778 A | 11/1994 | San Soucie et al. |
| 5,375,200 A | 12/1994 | Dugan et al. |
| 5,390,281 A | 2/1995 | Luciw et al. |
| 5,398,336 A | 3/1995 | Tantry et al. |
| 5,418,717 A | 5/1995 | Su et al. |
| 5,424,947 A | 6/1995 | Nagao et al. |

(Continued)

FOREIGN PATENT DOCUMENTS

| | | |
|---|---|---|
| EP | 0 458 563 A2 | 11/1991 |
| EP | 0 458 563 B1 | 11/1991 |

(Continued)

OTHER PUBLICATIONS

Abbasi. "Information Extraction Techniques for Postal Address Standardization" 2005.*

(Continued)

*Primary Examiner* — Greg Borsetti
(74) *Attorney, Agent, or Firm* — Blakely, Sokoloff, Taylor & Zafman LLP

(57) ABSTRACT

A method for detecting data in a sequence of characters or text using both a statistical engine and a pattern engine. The statistical engine is trained to recognize certain types of data and the pattern engine is programmed to recognize the grammatical pattern of certain types of data. The statistical engine may scan the sequence of characters to output first data, and the pattern engine may break down the first data into subsets of data. Alternatively, the statistical engine may output items that have a predetermined probability or greater of being a certain type of data and the pattern engine may then detect the data from the output items and/or remove incorrect information from the output items.

29 Claims, 11 Drawing Sheets

U.S. PATENT DOCUMENTS

| | | | |
|---|---|---|---|
| 5,434,777 A | 7/1995 | Luciw | |
| 5,437,036 A | 7/1995 | Stamps et al. | |
| 5,442,742 A | 8/1995 | Greyson et al. | |
| 5,463,772 A | 10/1995 | Thompson et al. | |
| 5,477,447 A | 12/1995 | Luciw et al. | |
| 5,483,352 A | 1/1996 | Fukuyama et al. | |
| 5,572,643 A | 11/1996 | Judson | |
| 5,583,921 A | 12/1996 | Hidaka | |
| 5,604,897 A | 2/1997 | Travis | |
| 5,608,624 A | 3/1997 | Luciw | |
| 5,621,658 A | 4/1997 | Jackson et al. | |
| 5,621,903 A | 4/1997 | Luciw et al. | |
| 5,627,948 A | 5/1997 | Fukunaga | |
| 5,634,124 A | 5/1997 | Khoyi et al. | |
| 5,642,435 A | 6/1997 | Loris | |
| 5,644,735 A | 7/1997 | Luciw et al. | |
| 5,649,222 A | 7/1997 | Mogilevsky | |
| 5,666,552 A | 9/1997 | Greyson et al. | |
| 5,687,333 A | 11/1997 | Dobashi et al. | |
| 5,692,032 A | 11/1997 | Seppänen et al. | |
| 5,708,845 A | 1/1998 | Wistendahl et al. | |
| 5,732,229 A | 3/1998 | Dickinson | |
| 5,737,734 A | 4/1998 | Schultz | |
| 5,752,052 A * | 5/1998 | Richardson et al. | 704/9 |
| 5,787,432 A | 7/1998 | LeTourneau | |
| 5,790,875 A | 8/1998 | Andersin et al. | |
| 5,794,142 A | 8/1998 | Vanttila et al. | |
| 5,799,268 A | 8/1998 | Boguraev | |
| 5,815,138 A | 9/1998 | Tsubaki et al. | |
| 5,815,142 A | 9/1998 | Allard et al. | |
| 5,838,458 A | 11/1998 | Tsai | |
| 5,838,906 A | 11/1998 | Doyle et al. | |
| 5,859,636 A | 1/1999 | Pandit | |
| 5,862,395 A | 1/1999 | Bier | |
| 5,864,789 A | 1/1999 | Lieberman et al. | |
| 5,878,386 A * | 3/1999 | Coughlin | 704/10 |
| 5,900,005 A | 5/1999 | Saito | |
| 5,906,656 A | 5/1999 | Keller et al. | |
| 5,946,629 A | 8/1999 | Sawyer et al. | |
| 5,946,647 A | 8/1999 | Miller et al. | |
| 5,966,652 A | 10/1999 | Coad et al. | |
| 5,987,029 A | 11/1999 | Kotani et al. | |
| 5,995,106 A | 11/1999 | Naughton et al. | |
| 6,026,233 A | 2/2000 | Shulman et al. | |
| 6,034,689 A | 3/2000 | White et al. | |
| 6,044,250 A | 3/2000 | Kuramatsu et al. | |
| 6,049,796 A | 4/2000 | Siitonen et al. | |
| 6,115,710 A | 9/2000 | White | |
| 6,125,281 A | 9/2000 | Wells et al. | |
| 6,212,494 B1 | 4/2001 | Boguraev | |
| 6,222,549 B1 | 4/2001 | Hoddie | |
| 6,249,283 B1 | 6/2001 | Ur | |
| 6,262,735 B1 | 7/2001 | Etel䫸pera | |
| 6,282,435 B1 | 8/2001 | Wagner et al. | |
| 6,323,853 B1 | 11/2001 | Hedloy | |
| 6,460,058 B2 | 10/2002 | Koppolu et al. | |
| 6,608,637 B1 | 8/2003 | Beaton et al. | |
| 6,622,306 B1 | 9/2003 | Kamada | |
| 6,678,706 B1 | 1/2004 | Fishel | |
| 6,711,624 B1 | 3/2004 | Narurkar et al. | |
| 6,714,941 B1 * | 3/2004 | Lerman et al. | 1/1 |
| 7,006,881 B1 | 2/2006 | Hoffberg et al. | |
| 7,467,181 B2 | 12/2008 | McGowan et al. | |
| 7,475,015 B2 * | 1/2009 | Epstein et al. | 704/257 |
| 7,613,610 B1 * | 11/2009 | Zimmerman et al. | 704/235 |
| 7,970,600 B2 * | 6/2011 | Chen et al. | 704/9 |
| 8,331,958 B2 * | 12/2012 | Hein et al. | 455/456.3 |
| 8,392,174 B2 * | 3/2013 | Cameron | 704/9 |
| 2002/0165717 A1 * | 11/2002 | Solmer et al. | 704/256 |
| 2002/0194379 A1 | 12/2002 | Bennett et al. | |
| 2004/0042591 A1 | 3/2004 | Geppert et al. | |
| 2004/0088651 A1 * | 5/2004 | McKnight et al. | 715/513 |
| 2004/0098668 A1 * | 5/2004 | Vehkomaki | 715/513 |
| 2004/0162827 A1 * | 8/2004 | Nakano | 707/6 |
| 2005/0022115 A1 | 1/2005 | Baumgartner et al. | |
| 2005/0060332 A1 * | 3/2005 | Bernstein et al. | 707/100 |
| 2005/0108630 A1 * | 5/2005 | Wasson et al. | 715/513 |
| 2005/0125746 A1 | 6/2005 | Viola et al. | |
| 2006/0009966 A1 * | 1/2006 | Johnson et al. | 704/10 |
| 2006/0047500 A1 * | 3/2006 | Humphreys et al. | 704/9 |
| 2006/0095250 A1 * | 5/2006 | Chen et al. | 704/9 |
| 2006/0116862 A1 * | 6/2006 | Carrier et al. | 704/1 |
| 2006/0245641 A1 * | 11/2006 | Viola et al. | 382/155 |
| 2006/0253273 A1 * | 11/2006 | Feldman et al. | 704/9 |
| 2006/0271835 A1 * | 11/2006 | Marcy et al. | 715/500 |
| 2006/0277029 A1 * | 12/2006 | Green et al. | 704/4 |
| 2007/0005586 A1 * | 1/2007 | Shaefer et al. | 707/5 |
| 2007/0015119 A1 * | 1/2007 | Atenasio | 434/130 |
| 2007/0083552 A1 * | 4/2007 | Allen et al. | 707/103 R |
| 2007/0150513 A1 * | 6/2007 | Vanden Heuvel et al. | 707/104.1 |
| 2007/0185910 A1 * | 8/2007 | Koike et al. | 707/104.1 |
| 2007/0234288 A1 * | 10/2007 | Lindsey et al. | 717/117 |
| 2007/0282900 A1 | 12/2007 | Owens et al. | |
| 2008/0091405 A1 * | 4/2008 | Anisimovich et al. | 704/4 |
| 2008/0147642 A1 * | 6/2008 | Leffingwell et al. | 707/5 |
| 2008/0243832 A1 * | 10/2008 | Adams et al. | 707/5 |
| 2008/0293383 A1 | 11/2008 | Rastas | |
| 2008/0312905 A1 * | 12/2008 | Balchandran et al. | 704/9 |
| 2008/0319735 A1 * | 12/2008 | Kambhatla et al. | 704/9 |
| 2009/0006994 A1 | 1/2009 | Forstall et al. | |
| 2009/0156229 A1 * | 6/2009 | Hein et al. | 455/456.1 |
| 2009/0204596 A1 * | 8/2009 | Brun et al. | 707/5 |
| 2009/0235280 A1 | 9/2009 | Tannier et al. | |
| 2009/0240485 A1 * | 9/2009 | Dalal et al. | 704/2 |
| 2009/0285474 A1 * | 11/2009 | Berteau | 382/159 |
| 2009/0292690 A1 | 11/2009 | Culbert | |
| 2009/0300054 A1 * | 12/2009 | Fisher et al. | 707/102 |
| 2009/0306961 A1 * | 12/2009 | Li et al. | 704/9 |
| 2010/0088674 A1 * | 4/2010 | Della-Libera et al. | 717/114 |
| 2010/0106675 A1 * | 4/2010 | Zartler et al. | 706/52 |
| 2011/0087670 A1 * | 4/2011 | Jorstad et al. | 707/741 |
| 2011/0099184 A1 * | 4/2011 | Symington | 707/755 |

FOREIGN PATENT DOCUMENTS

| | | |
|---|---|---|
| EP | 0458563 A2 | 11/1991 |
| EP | 0635808 A2 | 1/1995 |
| EP | 0 698 845 A1 | 2/1996 |
| EP | 0458563 B1 | 7/1996 |
| EP | 0 698 845 B1 | 1/2001 |
| EP | 0458563 B2 | 7/2001 |
| JP | 3046855 A | 2/1991 |
| JP | 10040014 A | 2/1998 |
| JP | 11088633 A | 3/1999 |
| WO | 95/34998 A2 | 12/1995 |
| WO | 95/34998 A3 | 12/1995 |
| WO | WO 95/34998 | 12/1995 |
| WO | WO 97/32439 | 9/1997 |
| WO | WO 99/66747 | 12/1999 |
| WO | WO 2008/109835 A2 | 9/2008 |
| WO | WO 2009/041982 A1 | 4/2009 |

OTHER PUBLICATIONS

Asadi et al. "Pattern-Based Extraction of Addresses from Web Page Content" Apr. 2008.*
Chieu et al. "A Maximum Entropy Approach to Information Extraction from Semi-Structured and Free Text" 2002.*
Tsai et al. "Mencius: A Chinese Named Entity Recognizer Using the Maximum Entropy-based Hybrid Model" 2004.*
Gali et al. "Aggregating Machine Learning and Rule Based Heuristics for Named Entity Recognition" Jan. 2008.*
Srihari et al. "A Hybrid Approach for Named Entity and Sub-Type Tagging" 2000.*
Li et al. "InfoXtract location normalization: a hybrid approach to geographic references in information extraction" 2003.*
Srihari et al. "InfoXtract: A Customizable Intermediate Level Information Extraction Engine" 2003.*
Yu et al. "Resume Information Extraction with Cascaded Hybrid Model" 2005.*
De Sitter et al. "Information Extraction via Double Classification" 2003.*
Spoustová. "Combining Statistical and Rule-Based Approaches to Morphological Tagging of Czech Texts" Jun. 2008.*
Florian et al. "Named Entity Recognition through Classifier Combination" 2003.*

Kozareva et al. "Combining data-driven systems for improving Named Entity Recognition" 2006.*
Grover et al. "XML-Based Data Preparation for Robust Deep Parsing" 2001.*
Church et al. "Using Statistics in Lexical Analysis" 1991.*
Henderson et al. "Exploiting Diversity in Natural Language Processing: Combining Parsers" 1999.*
U.S. Appl. No. 11/710,182, filed Feb. 23, 2007, titled "Pattern Search Methods and Apparatuses," by inventors Olivier Bonnet, et al., 28 pages (specification and drawings).
Eudora Mail Pro, "Windows Version 3.0 User Manual", Sep. 1996, pp. 3 total.
Eudora Mail Pro, "Version 3.0 for Windows User Manual", Jun. 1997, pp. 198 total.
Eudora Mail Light, "Version 3.1 for Macintosh User Manual", Apr. 1997, pp. 190 total.
International Preliminary Report on Patentability and Written Opinion for International PCT No. PCT/US2008/002263, mailed on Sep. 3, 2009, pp. 8 total.
Lin et al., "Postal Address Detection from Web Documents", IEEE Computer Society, copyright 2005, pp. 6 total.
Lerman, Kristina et al., "Automatically Labeling the Inputs and Outputs of Web Services", Proceedings of the National Conference on Artificial Intelligence (AAAI-2006), Menlo Park, CA, 2006, 6 pages.
Lerman, Kristina et al., "Populating the Semantic Web", Proceedings of the AAAI 2004 Workshop on Advances in Text Extraction and Mining, 2004, 6 pages.
Lerman, Kristina et al., "Wrapper Maintenance: A Machine Learning Approach", Journal of Artificial Intelligence Research, 18 (2003), pp. 149-181.
PCT International Search Report and Written Opinion for PCT International Appln. No. US2008/002263, mailed Aug. 4, 2008 (12 pages).
Eve Wilson, "Links and structures in hypertext databases for law," Hypertext: concepts, systems and applications, Cambridge University Press, New York, NY, 1992, pp. 194-211.
L. Nancy Garrett, K.E. Smith, N. Meyrowitz, "Intermedia: issues, strategies, and tactics in the design of a hypermedia document system," CSCW '86 Proceedings of the 1986 ACM Conference on Computer-supported cooperative work, ACM, New York, NY, 1986, pp. 163-174.
Eric A. Bier, "Embedded Buttons: Documents as user interfaces," UIST '91 Proceedings of the 4th annual ACM symposium on User interface software and technology, ACM, New York, NY, 1991, pp. 45-53.
Scott C. Deerwester, K. Waclena, M. Lamar, "A textual object management system," SIGIR '92 Proceedings of the 15th annual international ACM SIGIR conference on Research and development in information retrieval, ACM, New York, NY, 1992, pp. 126-139.
Chris Schmandt, "Phoneshell: the telephone as computer terminal," Multimedia '93 Proceedings of the first ACM international conference on Multimedia, ACM, New York, NY, 1993, pp. 373-382.
Larry Koved, B. Shneiderman, "Embedded menus: selecting items in context," Magazine Communications of the ACM, vol. 29, Issue 4, Apr. 1986, ACM, New York, NY, pp. 312-318.
A. Williams Salahshour, "Preferred Media Communication Establishment Mechanism," IBM Technical Disclosure Bulletin, Mar. 1994, Dallas, pp. 169-170.
J.M. Dunn, E.H. Stern, "Touch-Screen/Graphics Receive Message Application," IBM Technical Disclosure Bulletin, vol. 37, No. 04A, Apr. 1994, pp. 451-454.
Phil Hayes, "NameFinder: Software That finds Names in Text," Proceedings RIAO 94, vol. 1, Issue 11-13. October, New York, pp. 762-774, 1994.
Kenneth W. Church, L. Rau, "Natural Language Processing," Magazine Communications of the ACM, vol. 38, Issue 11, Nov. 1995, ACM New York, NY, pp. 71-79.
Bruce Krulwich, C. Burkey, "Intelligent Talk-And-Touch Interfaces Using Multi-Modal Semantic Grammars," Proceedings, Fourth Bar Ilan Symposium on Foundations of Artificial Intelligence, AAAI, 1995, pp. 103-112.

Kevin Knabe, "Apple guide: a case study in user-aided design of online help," Proceeding CHI '95 Conference companion on Human factors in computing systems, ACM New York, NY, 1995, pp. 286-287.
Hui Wang, D. Bell, J. Hughs, P. Ojha, "Neutral Network Approach to Relevance," Neural Networks, 1995. Proceedings, IEEE International Conference, vol. 4, Perth, WA , Australia, pp. 1961-1965.
Apple Computer Inc. "Newton Apple MessagePad Handbook," Apple Inc., Cupertino, CA, 1995, pp. 1-358.
John Stone, K. Newby, L. Dorsey, P. Ivanier, "The Newton Solutions Guide: Software, Peripherals and Accessories for Newton PDAs," Published by JointSolutions Marketing, 1995, pp. 1-64.
Keith Bostic, "V1.90: 4.3BSD-Reno/ Fourth Berkeley Software Distribution," Com.Archives, Jul. 6, 1990, pp. 1-11.
Maristella Agosti, M. Melucci, F. Crestani, "Automatic authoring and construction of hypermedia for information retrieval," Journal: Multimedia Systems—Special issue on content-based retrieval archive, vol. 3 Issue 1, Feb. 1995, Springer-Verlag New York, Inc., Secaucus, NJ, pp. 15-24.
Alfred V. Aho, M. J. Corasick, "Efficient string matching: an aid to bibliographic search," Magazine Communications of the ACM, vol. 18 Issue 6, Jun. 1975, ACM New York, NY, pp. 333-340.
Apple Computer, Inc., "Apple Computer Makes Six Newton Announcements," Apple Inc., Cupertino, CA, News Release, Stanford University Libraries, Cupertino, CA., Mar. 4, 1994, p. 30.
Apple Computer, Inc., "Newton Programmer's Reference for Newton 2.0," Apple Inc., Cupertino, CA, Addison-Wesley Publishing, Cupertino, CA, 1996, pp. 1376.
Christopher Barr, M. Neubarth, "Pen Pals," PC Magazine, vol. 12, No. 17, Oct. 12, 1993, pp. cover page, table of contents and 117-182.
Deborah Barreau, B.A. Nardi, "Finding and reminding: file organization from the desktop," Newsletter ACM SIGCHI, Bulletin, vol. 27 Issue 3, Jul. 1995, ACM, New York, NY, pp. 39-43.
David Benyon, D. Murray, "Development adaptive systems to fit individual aptitudes," IUI '93 Proceedings of the 1st intentional conference on Intelligent user interfaces, ACM, New York, NY, 1993, pp. 115-121.
Eric A. Bier, M.C. Stone, K. Fishkin, W. Buxton, T. Baudel, "A taxonomy of see-through tools," CHI '94 Conference companion on Human factors in computing systems, ACM, New York, NY, 1994, pp. 358-364.
Thomas Bonura, J. R. Miller, "Drop Zones: An extension to LiveDoc," Newsletter, ACM SIGCHI Bulletin, vol. 30 Issue 2, Apr. 1998, ACM, New York, NY, pp. 59-63.
Jim Miller, T. Bonura, "From documents to objects: an overview of LiveDoc," Newsletter, ACM, vol. 30 Issue 2, Apr. 1998, ACM, New York, NY, pp. 53-58.
Jeanette Borzo, T. Quinlan, "Word Perfect and Novell Plan to adopt OpenDoc: Apple's compound-document architecture," PC Expo 1993, Info World, vol. 15 issue 27, Jul. 5, 1993, pp. 8.
Helen Casbona, K. Vian, R. West, "User's Guide," NextStep, Jan. 1, 1993, pp. 384.
Daniel T. Chang, "HieNet: a user-centered approach for automatic link generation," HYPERTEXT '93 Proceedings of the fifth ACM conference on Hypertext, ACM, New York, NY, 1993, pp. 145-158.
Doug Clapp, "The Next Bible: Hardware and Software Systems for the Next Computer," Brady Books, NY, 1990, pp. 683.
Philip R. Cohen, A. Cheyer, M. Wang, S.C. Baeg, "An open agent architecture," Readings in agents, Morgan Kaufmann Publishers Inc., San Francisco, CA, 1998, pp. 197-204.
Allen Cypher, "Watch What I Do: Programming by Demonstration," The MIT Press,Cambridge, Massachusetts London, England, 1993, pp. 652.
Allen Cypher, "EAGER: programming repetitive tasks by example," CHI '91 Proceedings of the SIGCHI conference on Human factors in computing systems: Reaching through technology, ACM, New York, NY, 1991, pp. 33-39.
Anind K. Dey, G.D. Abowd, A. Wood, "CyberDesk: a framework for providing self-integrating context-aware services," IUI '98 Proceedings of the 3rd international conference on Intelligent user interfaces, ACM, New York, NY, 1998, pp. 47-54.
Eric Ding, "GNU Emacs," Free Software Foundation Inc., Aug. 15, 1995, Boston, MA, pp. 5.

Ivor Durham, D.A. Lamb, J.B. Saxe, "Spelling correction in user interfaces," Magazine, Communications of the ACM, vol. 26 Issue 10, Oct. 1983, ACM, New York, NY, pp. 709-710.

Jay Earley, "An efficient context-free parsing algorithm," Magazine, Communications of the ACM—Special 25th Anniversary Issue, vol. 26 Issue 1, Jan. 1983, ACM, New York, NY, pp. 3.

GO Cororation, "PenPoint: Architectural Reference vol. II," Addison-Wesley Publishing Company, Jun. 1992, Foster City, CA, pp. 528.

GO Cororation, "PenPoint: Architectural Reference vol. I," Addison-Wesley Publishing Company, Apr. 1992, Foster City, CA, pp. 645.

R.E. Griswold, J.F. Poage, I.P. Polonsky, "The Snobol4 Programing Language: Second Edition," Prentice Hall Inc., Englewood Cliffs, NJ, May 1970, pp. 256.

Kevin Hughes, "Entering the World-Wide Web: A guide to cyberspace," ACM SIGLINK Newsletter, vol. III, No. I, Mar. 1994, pp. 4-8.

Eric Jackson, D. Appelt, J. Bear, R. Moor, A. Podlozny, "A template matcher for robust NL interpretation," HLT '91 Proceedings of the workshop on Speech and Natural Language, Association for Computational Linguistics Stroudsburg, PA, 1991, pp. 190-194.

Kaare Christian, S. Richter, "The Unix Operating System: Third Edition," John Wiley & Sons Inc., New York, NY, 1994, pp. 541.

Christopher Kennedy, B. Boguraev, "Anaphora in a Wider Context: Tracking Discourse Referents," ECAI 96, 12th European Conference on Artificial Intelligence, John Wiley & Sons, 1996, pp. 582-586.

Erica Kerwien, "Lotus Notes Application Development Handbook," IDG Book Worldwide Inc., Foster City, CA, Dec. 1994, pp. 506.

David Kurlander, S. Feiner, "Interactive constraint-based search and replace," CHI '92 Proceedings of the SIGCHI conference on Human factors in computing systems, ACM, New York, NY, 1992, pp. 609-618.

David Kurlander, E.A. Bier, "Graphical Search and Replace," Computer Graphics, vol. 22 Issue 4, Aug. 1988, Proceedings of SIGGRAPH '88, Atlanta, Georgia, pp. 113-120.

Kum-Yew Lai, T.W. Malone, K-C. Yu, "Object lens: a "spreadsheet" for cooperative work," ACM Transactions on.Information Systems (TOIS) TOIS, vol. 6 Issue 4, Oct. 1988, ACM, New York, NY, pp. 332-353.

Samuel J. Leffler, M. Kirk, M.J. Karels, J.S. Quarterman, "The Design and Implementation of 4.3 BSD UNIX Operation System Answer Book," Addison-Wesley Publishing, 1989, pp. 471.

Don Libes, "Exploring Expert: a tcl-based toolkit for automating interactive programs," O'Reilly & Associates Inc., Jan. 1995, Sebastopol, CA, pp. 566.

Henry Lieberman, "Demonstrational Techniques for Instructible User Interface Agents," AAAI Technical Report SS-94-03, AAAI, 1994, Cambridge, MA, pp. 107-109.

Henry Lieberman, B. Nardi, D. Wright, "Training agents to recognize text by example," AGENTS '99 Proceedings of the third annual conference on Autonomous Agents, ACM, New York, NY, 1999, pp. 116-122.

Pattie Maes, "Agents that reduce work and information overload," Communications of the ACM, vol. 37 Issue 7, Jul. 1994, ACM, New York, NY, pp. 30-40.

Thomas W. Malone, K. Lai, C. Fry, "Experiments with Oval: A Radically Tailorable Tool for Cooperative Work," ACM Transactions on Information Systems (TOIS),vol. 13 Issue 2, Apr. 1995, ACM, New York, NY, pp. 177-205.

Hausi A. Muller, S.R. Tilley, K. Wong, "Understanding software systems using reverse engineering technology perspectives from the Rigi project," CASCON '93 Proceedings of the 1993 conference of the Centre for Advanced Studies on Collaborative research: software engineering—vol. 1,IBM Press, 1993, pp. 217-226.

Brad A. Myers, W. Buxton, "Creating highly-interactive and graphical user interfaces by demonstration,"SIGGRAPH '86 Proceedings of the 13th annual conference on Computer graphics and interactive techniques, vol. 20 Issue 4, Aug. 1986, ACM, New York, NY, pp. 249-258.

Bonnie A. Nardi, V. O'Day, "Intelligent Agents: What We Learned at the Library," Libri. vol. 46 Issue 2, Jan. 1996, Cupertino, CA, pp. 59-88.

Bonnie A. Nardi, J.R. Miller, D.J. Wright, "Collaborative, programmable intelligent agents," Communications of the ACM, vol. 41 Issue 3, Mar. 1998, ACM, New York, NY, pp. 96-104.

Netscape Communication Corporation, "Netscape's DDE Implementation," Netscape Communications Corporation, Mar. 22, 1995, pp. 16.

Netscape Communication Corporation, R. Silino, "Netscape Unveils Netscape Navigator 1.1," PR Newswire, Mar. 6, 1995, Mountain View, CA, pp. 3.

Netscape Communication Corporation, "Netscape Communications Ships Release 1.0 of Netscape Navigator and Netscape Servers," Netscape News Release, Mar. 15, 1994, Mountain View, CA, pp. 2.

Christopher Bey, Apple Press, "Newton Programmer's Guide: for Newton 2.0," Addison-Wesley Publishing, Cupertino, CA, 1996, pp. 928.

Christopher Bey, B. Anders, J. Perry, J. Simonoff, "Newton Programmer's Guide," The Apple Publishing System, Cupertino, CA, 1994, pp. 893.

John Markoff, "Microsoft Comes to the Aid of a Struggling Apple," New York Times, Boston, MA, Aug. 7, 1997, pp. 2.

NeXT Computer Inc., "NeXT Technical Summaries," NeXT Computer Inc., Redwood City, CA, Dec. 1990, pp. 365.

NeXT Computer Inc., "NXBundle," NeXT Computer Inc., 1995, pp. 10.

NeXT Computer Inc., "OpenStep Specification," NeXT Computer Inc., Oct. 19, 1994, pp. 518.

Gary Miller, J. Inscore, "NeXT Development Tools," NeXT Computer Inc., Redwood City, CA, 1990, pp. 254.

NeXT Computer Inc., "NeXTSTEP programming interface summary, release 3," Addison-Wesley, 1992, pp. 467.

NeXT Computer Inc., "NeXTStep 3.3: Developer Documentation Manuals," NeXT Software Inc., 1994.

Stan Augarten, H. Casabona, C. Rose, H. Ross, L. Koponen, "The NeXT User's Reference Manual," NeXT Inc., Redwood City, CA 1989, pp. 450.

NeXT Publications, "NeXTStep User Interface Guidelines: Release 3," Addison-Wesley, Apr. 1993, pp. 184.

Gary Miller, K. Walrath, "NeXT Operating System Software," NeXT Computer Inc., Redwood City, CA, 1990, pp. 244.

NeXT Publications, "Development Tools and Techniques: Release 3," Addison-Wesley, Nov. 1993, pp. 453.

NeXT Publications, "NeXTStep: Object-Oriented Programming and the Objective C Language: Release 3," Addison-Wesley, Nov. 1993, pp. 240.

NeXT Publications, "NeXTStep: Programming Interface Summary," Addison-Wesley, Apr. 1993, pp. 466.

NeXT Computer Inc., "3.3 Release Notes: C Compiler," NeXT Computer Inc., 1995, pp. 149.

NeXT Publications "NeXTStep: General Reference vol. 1: Release 3," Addison-Wesley, Nov. 1992, pp. 1230.

NeXT Publications "NeXTStep: General Reference vol. 2: Release 3," Addison-Wesley, Nov. 1992, pp. 1356.

NeXT Publications "NeXTStep: Operating System Software," Addison-Wesley, Sep. 1992, pp. 451.

Alex Duong Nghiem, "NeXTSTEP programming: concepts and applications," Prentice-Hall, Inc., Upper Saddle River, NJ, 1993, pp. 604.

Andrew J. Novobilski, "PenPoint programming: edition 1," Addison-Wesley, Reading, Ma., 1992, pp. 385.

Milind S. Pandit, S. Malbag, "The selection recognition agent: instant access to relevant information and operations," IUI '97 Proceedings of the 2nd international conference on Intelligent user interfaces, ACM, New York, NY, 1997, pp. 47-52.

Pensoft Corp., "Pensoft Corp.: Announces Perspective Built into Every EO Personal Communicator 440 and 880 Models," PR Newswire, Redwood City, CA, Nov. 4, 1992, pp. 1.

Pensoft Corp., "Pensoft Corp.: Announcement of Shipping," PR Newswire, Redwood City, CA, Jan. 11, 1993, pp. 1.

Pensoft Corp., "Pensoft Corp.: Perspective Handbook," Pensoft Corp. Redwodd City, CA, Nov. 1992, pp. 278.

Tom Quinlan, "OpenDoc will lack networking support: WordPerfect, Apple forego DSOM initially," LexisNexis, Info World Media Group, Aug. 15, 1994, pp. 1-2.

Daniel E. Rose, C. Stevens, "V-Twin: A Lightweight Engine for Interactive Use," Apple Research Laboratories, Apple Computer, Inc., Cupertino, CA, 1996, pp. 12.

Gerard Salton, "Automatic text processing: the transformation, analysis, and retrieval of information by computer," Addison-Wesley Longman Publishing Co., Inc., Boston, MA, 1989, pp. 248-266.

Gerard Salton, C. Buckley, "Automatic text structuring and retrieval-experiments in automatic encyclopedia searching," SIGIR '91 Proceedings of the 14th annual international ACM SIGIR conference on Research and development in information retrieval, ACM, New York, NY, 1991, pp. 21-30.

Jeffrey C. Schlimmer, L.A. Hermens, "Software agents: completing patterns and constructing user interfaces," Journal of Artificial Intelligence Research, vol. 1 Issue 1, Aug. 1993, pp. 61-89.

Michael A. Schoonover, J.S. Bowie, W.R. Arnold, "GNU Emacs: UNIX Text Editing and Programing," Addison-Wesley, Reading, MA, Jan. 1996, pp. 609.

Stephanie Seneff, "A relaxation method for understanding spontaneous speech utterances," HLT '91 Proceedings of the workshop on Speech and Natural Language, Association for Computational Linguistics Stroudsburg, PA, 1992, pp. 299-304.

Michael B. Shebanek, "The Complete Guide to the Nextstep User Environment," Springer Verlag, Aug. 1, 1993, New York, NY, Telos the Electronic Library of Science, Santa Clara, CA, pp. 466.

Walter R. Smith, "Using a Prototype-based Language for User Interface: The Newton Project's Experience," OOPSLA '95 Proceedings of the tenth annual conference on Object-oriented programming systems, languages, and applications, ACM, New York, NY, 1995, pp. 61-72, ACM SIGPLAN Notices, vol. 30 Issue 10, Oct. 17, 1995, pp. 61-72.

Walter R. Smith, "The Newton Application Architecture," Proc. of the 39th IEEE Computer Society Int. Conference, pp. 156-161, San Francisco, 1994.

Bruce F. Webster, "The NeXT Book," Addison-Wesley, Reading, MA, 1989, pp. 387.

Shawn Willett, T. Quinlan, "Novell seeking object framework for NetWare," News/Networking,LexisNexis, Info World Media Group, May 2, 1994, pp. 45.

Charles Babcock, "A matter of choice: Charting an object-oriented course depends on what you want to do when," CSJ, Object Technology, LexiNexis, ComputerWorld, May 1, 1994, pp. 59.

Tom Quinlan, Novell eyes larger role in OpenDoc: WordPerfect purchase fuels push, Top of the News, LexisNexis, Info World Media Group, Apr. 11, 1994, pp. 1.

Melinda-Carol Ballou, CW Staff, "Object technologies draw good reviews: Some cite shortcomings in Microsoft model," Application Development, LexisNexis, ComputerWorld, Mar. 21, 1994, pp. 91.

Newsbytes, Watcom Launches New C/C++ Tools, Deals, LexisNexis, Post-Newsweek Business Information Inc., Mar. 17, 1994, Waterloo, Ontario, Canada.

Bob Metcalfe, "Platform Olympic teams converge on CORBA?," From the Ether, LexisNexis, Info World Media Group, Mar. 7, 1994.

Newsbytes, "Object World—IBM's SOM is Stepping Stone to Taligent, "LexisNexis, Post-Newsweek Business Information Inc., Boston, MA., Jan. 18, 1994.

Newsbytes, "Object World—DEC Presents Plans for OLE & COM," LexisNexis, Post-Newsweek Business Information Inc., Boston, MA., Jan. 18, 1994.

John Blackford, "IBM offers a peek at tomorrow's software: marketing strategy for OS/2 operating system," Direct from the editor, Column, LexisNexis, Gale Group, vol. 14 No. 1, Jan. 1, 1994, pp. 58.

Willem Knibbe, "Microsoft, DEC craft object model: Claims of object access across nine platforms raise vendors' eyebrows," LexisNexis, Info World Media Group, Dec. 6, 1993, pp. 1.

Ed Scannell, V. McCarthy, "Object System to aid corporate downsizing," News: PC Expo, LexisNexis, Info World Media Group, Jul. 5, 1993, pp. 8.

Jeanette Borzo, T. Quinlan, "WordPerfect and Novell plan to adopt OpenDoc: Apple architecture lets users read, edit document across platforms," News: PC Expo, LexisNexis, Info World Media Group, New York, NY, Jul. 5, 1993, pp. 8.

Exhibit 647-1 (Nov. 24, 2010), Claim Chart "Perspective System," References cited: Perspective Source Code 1992-93 (Code), Pensoft Corporation, Perspective Handbook, Nov. 1992 (Handbook), pp. 46.

Exhibit 647-3 (Nov. 24, 2010), Claim Chart "Spellchecking Systems," References cited: Larry Koved and Ben Shneiderman, Embedded Menus: Selecting Items in Context, Communications of the ACM, vol. 29, No. 4. p. 312-318. Apr. 1986. (Koved), U.S. Patent No. 5,437,036 to Microsoft, Text checking application programming interface (036 Patent), U.S. Patent No. 5,604,897 to Microsoft, Method and system for correcting the spelling of misspelled words (897 patent), NEXT Computer, Inc., NeXTSTEP General (Reference). Reference—Release 3, vol. 1 (1992) (Reference), NeXT Computer, Inc., NeXTSTEP General Reference—Release 3, vol. 1 (1992) (Reference 2), pp. 32.

Exhibit 647-4 (Nov. 24, 2010), Claim Chart "WordPerfect," Reference cited: Novell, WordPerfect User's Guide (MAC), V.3.1, 1994 (WP Users Guide), NeXT Computer, Inc., "NeXTSTEP General Reference—Release 3, vol. 1" (1992) ("Reference"), NeXT Computer, Inc., "NeXTSTEP General Reference—Release 3, vol. 2" (1992) ("Reference 2"), pp. 33.

Exhibit 647-5 (Nov. 24, 2010), Claim Chart "Selection Recognition Agent," References Cited: U.S. Patent No. 5,859,636 to Intel Corporation (filed Dec. 27, 1995) ("Pandit"), Milind S. Pandit and Sameer Kalbag, The Selection Recognition Agent: Instant Access to Relevant Information and Operations, ACM 1997 (SRA), U.S. Patent No. 5,437,036 to Microsoft Corporation (filed Sep. 3, 1992) (Stamps), Gerald Salton, Automatic Text Processing: The Transformation, Analysis, and Retrieval of Information by Computer, 1989 (Salton), U.S. Patent No. 5,649,222 to Microsoft Corpporation (filed May 8, 1995) Mogilevsky), Koved and Ben Shneiderman, Embedded Menus: Selecting Items in Context (Communications of the ACM, vol. 29 No. 4 Apr. 1986) (Koved), pp. 39.

Exhibit 647-7 (Nov. 24, 2010), Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Patent No. 5,437,036 to Microsoft Corporation (filed Sep. 3, 1992) (Stamps), U.S. Patent No. 5,649,222 to Microsoft Corporation (filed May 8, 1995) (Mogilevsky), Koved and Ben Shneiderman, Embedded Menus: Selecting Items in Context (Communications of the ACM, vol. 29 No. 4 Apr. 1986) (Koved), pp. 20.

Exhitbit 647-8 (Nov. 24, 2010), Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2 (1992) (Reference 2),Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.

Exhibit 647-10 (Nov. 24, 2010), Claim Chart "Apple Newton", References cited: Apple Computer, Inc., Newton Programmer's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.

Exhibit 647-13 (Nov. 24, 2010), Claim Chart "U.S. Patent No. 5,483,352," References cited: U.S. Patent No. 5,483,352 assigned to Fujitsu (Fukuyama at filing date Aug. 26, 1993) (Fukuyama), pp. 19.

Exhibit 647-15 (Nov. 24, 2010), Claim Chart "GNU Emacs—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4, p. 312-318. Apr. 1986 (Koved), pp. 17.

Exhibit 647-16 (Nov. 24, 2010), Claim Chart "Eager," References cited: Allen Cypher, Progoramming Repetitive Tasks by Example, 1991 (Eager), Eager Video by Allen Cypher (Eager Video), Edited by Allen Cypher, Watch What I do: Programming by Example, (1993) (Watch What I Do), U.S. Patent No. 5,859,636 to Intel Corporation (filed Dec. 27, 1995) (Pandit), General Salton, Automatic Text Processing: The Transformation, Analysis, and Retrieval to Information by Computer, 1989 (Salton), pp. 24.

Nokia Supplemental Response to Interrogatories (Nov. 17, 2010): Invalidity Claim Charts based on U.S. 5,859,636; Newton Apple Message Pad Handbook; U.S. 5,434,777; U.S. 5,477,447; U.S. 5,815,142; U.S. 5,483,352; and EP0458563.

Robert Welland, G. Seitz, L. Wang, L. Dyer, T. Harrington, D. Culbert, "The Newton Operating System," to appear in Proceedings of the 1994 IEEE Computer Conference, IEEE, San Francisco, CA, 1994, pp. 8.

Apple Computer Inc., Newton Programmer's Guide: System Software, vol. 2, First Edition, 1995, Apple Inc., Cupertino, CA.

Milind S. Pandit, S. Kalbag, "The selection recognition agent: instant access to relevant information and operations," IUI '97 Proceedings of the 2nd international conference on Intelligent user interfaces, ACM, New York, NY, 1997, pp. 47-52.

Melinda-Carol Ballou, CW Staff, "Through cooperation come standards," Appl/Dev, ComputerWorld, May 16, 1994, pp. 85.

Nokia Corporation, "Nokia 2110: User's Guide," Nokia Mobile Phones, 1994, pp. 52.

Microsoft Corporation, "User's Guide Microsoft Word: The World's Most Popular Word Processor version 6.0," Microsoft Corporation, 1993, pp. 606.

Kenneth W. Church, L.F. Rau, "Commercial applications of natural language processing," Communications of the ACM CACM Homepage archive vol. 38, Issue 11, Nov. 1995, ACM, New York, NY, pp. 71-79.

Apple Computer Inc., Newton Program's Guide: System Software, vol. 1, First Edition, 1995, Apple Inc., Cupertino CA.

Apple Computer Inc., "Revision to the Mar. 14, 1993 developer confidential price list," Apple Computer Inc, Cupertino, CA, Apr. 25, 1995, pp. 24.

Apple Computer Inc., "Revision to the Aug. 2, 1994 developer confidential price list," Apple Computer Inc, Cupertino, CA, Sep. 12, 1994, pp. 25.

Apple Computer Inc., "Revision to the Oct. 17, 1994 collegiate partnership program level 1 confidential price list," Apple Computer Inc, Cupertino, CA, Nov. 14, 1994, pp. 26.

Exhibit 647-1, Claim Chart "Perspective System," References cited: Perspective Source Code 1992-93 (Code), Pensoft Corporation, Perspective Handbook, Nov. 1992 (Handbook), pp. 46.

Exhibit 647-10, Claim Chart "Apple Newton", References cited: Apple Computer, Inc., Newton Programm's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.

Exhibit 647-13, Claim Chart "U.S. Patent No. 5,483,352," References cited: U.S. Patent No. 5,483,352 assigned to Fujitsu (Fukuyama at filing date Aug. 26, 1993) (Fukuyama), pp. 19.

Exhibit 647-15, Claim Chart "GNU Emac—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4, p. 312-318. Apr. 1986 (Koved), pp. 17.

Exhibit 647-16, Claim Chart "Eager," References cited: Allen Cypher, Programming Repetitive Tasks by Example, 1991 (Eager), Eager Video by Allen Cypher (Eager Video), Edited by Allen Cypher, Watch What I do: Programming by Example, (1993) (Watch What I Do), U.S. Patent No. 5,859,636 to Intel Corporation (filed Dec. 27, 1995) (Pandit), Gerald Salton, Automatic Text Processing: The Transformation, Analysis, and Retrieval of Information by Computer, 1989 (Salton), pp. 24.

Exhibit 647-3, Claim Chart "Spellchecking Systems," References cited: Larry Koved and Ben Shneiderman, Embedded Menus: Selecting Items in Context, Communications of the ACM, vol. 29, No. 4. p. 312-318. Apr. 1986. (Koved), U.S. Patent No. 5,437,036 to Microsoft (036 Patent), Text checking application programming interface (036 Patent), U.S. Patent No. 5,604,897 to Microsoft, Method and system for correcting the spelling of misspelled words (897 Patent), NeXT Computer, Inc., NeXTSTEP General Reference—Release 3, vol. 1 (1992) (Reference), NeXT Computer, Inc., NeXTSTEP General Reference—Release 3, vol. 2 (1992) (Reference 2), pp. 32.

Exhibit 647-4, Claim Chart "WordPerfect," Reference cited: Novell, WordPerfect User's Guide (MAC), V 3.1, 1994 (WP Users Guide), NeXT Computer, Inc., "NeXTSTEP General Reference—Release 3, vol. 1" (1992) ("Reference 2"), NeXT Computer, Inc., "NeXTSTEP General Reference—Release 3, vol. 2" (1992) ("Reference 2"), pp. 33.

Exhibit 647-5, Claim Chart "Selection Recognition Agent," References cited: U.S. Patent No. 5,859,636 to Intel Corporation (filed Dec. 27, 1995) ("Pandit"), Milind S. Pandit and Sameer Kalbag, The Selection Recognition Agent: Instant Access to Relevant Information and Operation, ACM 1997 (SRA), U.S. Patent No. 5,437,036 to Microsoft Corpporation (filed Sep. 3, 1992) (Stamps), Gerald Salton, Automatic Text Processing: The Transformation, Analysis, and Retrieval of Information by Computer, 1989 (Salton), U.S. Patent No. 5,649,222 to Microsoft Corporation (filed May 8, 1995) Mogilevsky), Koved and Ben Shneiderman, Embedded Menus: Selecting Items In Context (Communications of the ACM, vol. 29 No. 4 Apr. 1986) (Koved), pp. 39.

Exhibit 647-7, Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Patent No. 5,437,036 to Microsoft Corporation (filed Sep. 3, 1992) (Stamps), U.S. Patent No. 5,649,222 to Microsoft Corporation (filed May 8, 1995) Mogilevsky), Koved and Ben Shneiderman, Embedded Menis: Selecting Items In Context (Communications of the ACM, vol. 29 No. 4 Apr. 1986) (Koved), pp. 20.

Exhibit 647-8, Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2 (1992) (Reference 2),Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.

Exhibit 647-11, Claim Chart "Netscape Navigator,"References cited: Netscape Navigator version 1.0, Dec. 1994 (Netscape 1.0), Netscape Navigator version 1.1, Mar. 1995 (Netscape 1.1), http://graphcomp.com/info/specs/nets/ddeapi.html, Apr. 1995 (DDE), pp. 18.

Exhibit 647-12, Claim Chart "More Command in 4.3BSD," References cited: University of California, Berkeley, BSD General Commands Manual—More Command in 4.3BSD, Jul. 24, 1990 (Manual), 4.3BSD-Reno Source Code, comp archives (USENET newsgroup), Jul. 6, 1990, (Code), Samuel J. Leffler, Marshall Kirk McKusick, Michael J. Karels and John S. Quarterman, The Design and Implementation of the 4.3BSD UNIX Operating System, Nov. 1989 (Lefler), pp. 18.

Exhibit 647-14, Claim Chart "GNU Emacs," References cited: GNU Emacs (Version 18.59) Source Code, Oct. 31, 1992 (EmacsSrc), Michael A. Schoonover, John S. Bowie, William R. Arnold, GNU Emacs: UNIX Text Editing and Programming, 1992 (Schoonover), pp. 33.

Exhibit 647-17, Claim Chart "HieNet System," References cited: Daniel T. Chang, HieNet: A User-Centered Approach for Automatic Link Generation, 1993 (Chang), U.S. Patent No. 5,437,036 to Microsoft Corporation (filed Sep. 3, 1992) (Stamps), U.S. Patent No. 5,859,636 to Intel Corporation (filed Dec. 27, 1995) (Pandit), Gerald Salton, Automatic Text Processing: The Transformation, Analysis, and Retrieval of Information by Computer, 1989 (Salton), U.S. Patent No. 5,649,222 to Microsoft Corporation (filed May 8, 1995) Mogilevsky), Koved and Ben Shneiderman, Embedded Menus: Selecting items in context (Communications of the ACM, vol. 29 No. 4 Apr. 1986) (Koved), pp. 39.

Exhibit 647-2, Claim Chart "Vi in 4.3BSD," References cited: University of California, Berkeley, BSD General Commands Manual—Vi, in 4.3BSD, Jul. 24, 1990 (Manual), University of California, Berkeley, BSD General Commands Manual—Ex, in 4.3BSD, Jul. 24, 1990 (Ex), University of California, Berkeley, BSD General Commands Manual—Ed, in 4.3BSD, Jul. 24, 1990 (Ed), William Joy and Mark Horton, Introduction to Display Editing in Vi, 1982 (Joy), 4.3BSD-Reno Source Code, Comp.archives (USENET newsgroup), Jul. 6, 1990. (Code), Samuel J. Leffler, Marshall Kirk McKusick, Michael J. Karels, and John S. Quarterman, The Design and Implementation of the 4.3BSD UNIX Operating Systems, Nov. 1989 (Leffler), pp. 22.

Exhibit 647-6, Claim Chart "OPENSTEP," References cited: NeXT Computer, Inc., OPENSTEP Specification, Oct. 19, 1994 (Specification), pp. 23.

Exhibit 649-9, Claim Chart "NeXTSTEP Release 3—Project Application Builder," References cited: NeXT Computer, Inc., NeXTSTEP Development Tools and Techniques—The Project Application Builder Oct. 1992 (Project Builder), NeXT Computer, Inc., NeXTSTEP Development Tools and Techniques—The Project Application Builder Oct. 1992 (C Compiler), Video, Steve Jobs Demos NeXTSTEP (Steve Jobs Demo), NeXT Computer, Inc., NeXTSTEP General Reference—Release 3, vol. 1 (1992) (Reference), NeXT Computer, Inc., NeXTSTEP General—Release 3, vol. 2 (1992) (Reference 2), pp. 22.

Appendix 10, Claim Chart "U.S. Patent No. 5,483,352," References cited: U.S. Patent No. 5,483,352 (filed Aug. 26, 1993) (Fukuyama), Gerald Salton, Automatic Text Processing: The Transformation, Analysis, and Retrieval of Information by Computer (Michael A. Harrison ed., Addison-Wesley 1989) (Salton), pp. 33.

Appendix 11, Claim Chart "Koved," References cited: Larry Koved & Ben Shneiderman, Embedded Menus: Selecting Items in Context, vol. 29, No. 4., Ass'n for Computing Machining, 312 (1986) (Koved), U.S. Patent No. 5,437,036 (filed Sep. 3, 1992) (Stamps), Gerald Salton, Automatic Text Processing: The Transformation Analysis, and Retrieval of Information by Computer (Michael A. Harrison ed., Addison-Wesley 1989),Next Publications, Nextstep General Reference vol. 1 (1992) and NEXT Publications, NeXTSTEP General Reference vol. 2 (1992) (collective, Reference) U.S. Patent No. 5,649,222 (filed May 8, 1995) Mogilevsky), pp. 39.

Appendix 12, Claim Chart "U.S. Patent No. 5,437,036," References cited: U.S. Patent No. 5,437,036 (filed Sep. 3, 1992),(Stamps), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), NeXT Publications, NeXTSTEP General Reference vol. 1 & NeXT Publications, NeXTSTEP General Reference vol. 2 (1992) (collectively, Reference), U.S. Patent No. 5,649,222 (filed May 8, 1995) Mogilevsky, pp. 41.

Appendix 13, Claim Chart "Netscape Navigator 1.0 and 1.1," References cited: Screenshots of Netscape Navigator version 1.1, Mar. 1995 (Netscape 1.1), Gerald Salton, Automatic Text Processing: The Transformation, Analysis, and Retrieval of Information by Computer (Michael A. Harrison ed., Addison-Wesley 1989) (1989) (Salton), pp. 46.

Appendix 14, Claim Chart "The Newton system," References cited: Apple Computer, Inc., Newton Programmer's Guide for Newton 2.0, 1996 (Guide), Screenshots taken on an MessagePad 110 running Newton 1.2 operating system. I have personally confirmed that all functionality demonstrated by the screenshots exist on a MessagePad 110 running the Newton 1.2 operating system, Pensoft Corporation, Perspective Handbook (1992) (Perspective Handbook), Gerald Salton, Automatic Text Processing: The Transformation, Analysis, and Retrieval of Information By computer (Michael A. Harrison ed., Addison-Wesley 1989) (Salton), pp. 54.

Appendix 15, Claim Chart "Selection Recognition Agent," References cited: Milind S. Pandit and Sameer Kalbag, The Selection Recognition Agent: Instant Access to Relevant Information and Operations, ACM 1997 (SRA), pp. 28.

Appendix 4, Claim Chart "Perspective System," Materials cited: Perspective Source Code 1992-93 (Code), Pensoft Corporation, Perspective Handbook (1992) (Handbook), Screenshots taken on an AT&T EO Personal Communicator model 440 and 880. I have personally confirmed that all functionality demonstrated by the screenshots exist on an AT&T EO Personal Communicator model 440 and 800 running either Personal Perspective or the Perspective Business Edition, Gerald Salton, Automatic Text Processing: The Transformation, Analysis, and Retrieval of Information by Computer (Michael A. Harrison ed., Addison-Wesley 1989) (Salton), pp. 88.

Appendix 5, Claim Chart "Perspective Handbook," References cited: Pensoft Corporation, Perspective Handbook (1992) ("Handbook"), Gerald Salton, Automatic Text Processing: The Transformation, Analysis, and Retrieval of Information by Computer (Michael A. Harrison ed., Addison-Wesley 1989) (Salton), pp. 43.

Appendix 6, Claim Chart "NeXTSTEP System," Materials cited: NeXT Publications, NeXTSTEP General Reference vol. 1 & NeXT Publications, NeXTSTEP General Reference vol. 2 (1992) (collectively, Reference), U.S. Patent No. 5,437,036 (filed Sep. 3, 1992) (Stamps), U.S. Patent No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrion ed., Addison-Wesley 1989) (Salton), pp. 68.

Appendix 7, Claim Chart "NeXTSTEP General Reference vol. 1 & NeXTSTEP General Reference vol. 2,"References cited: NeXT Publications, NeXTSTEP General Reference vol. 1 (1992) (Reference vol. 1), NeXT Publications, NeXTSTEP General Reference vol. 2 (1992) (Reference vol. 2), U.S. Patent No. 5,437,036 (filed Sep. 3, 1992) (Stamps), U.S. Patent No. 5,649,222 (filed May 8, 1995) (Mogilevsky), Larry Koved & Ben Shneiderman, Embedded Menus: Selecting Items in Context, vol. 29, No. 4, Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), pp. 43.

Apendix 8, Claim Chart "U.S. Patent No. 5,859,636," Reference cited: U.S. Patent No. 5,859,636 (filed Dec. 27, 1995) (Pandit), U.S. Patent No. 5,437,036 (filed Sep. 3, 1992) (Stamps), Gerald Salton, Automatic Text Processing: The Transformation, Analysis, and Retrieval of Information by Computer (Michael A. Harrison ed., Addiston-Wesley 1989), U.S. Patent No. 5,649,222 (filed May 8, 1995) (Mogilevsky), Larry Koved & Ben Shneiderman, Embedded Menus: Selecting Items in Context, vol. 29, No. 4., Ass'n for Computing Machining 312 (1986) ("Koved"), pp. 48.

Appendix 9, Claim Chart "European Patent Office Publication No. 0 458 563 A2," References cited: European Patent Office Publication No. 0 458 563 A2 (published Nov. 27, 1991) (Nokia), U.S. Patent No. 5,437,036 (filed Sep. 3, 1992) (Stamps), U.S. Patent No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), pp. 35.

Doug Barney, "Big Blue pitches a play-by-play of its OS plan,"News/Software; Technology Analysis, LexiNexis, Info World Media Group, Jul. 11, 1994, pp. 21.

Tom Quinlan, "WordPerfect shipping alpha of OpenDoc," News, LexiNexis, Info World Media Group, New York, Jul. 4, 1994, pp. 8.

ED Scannell, C. Stedman, CW Staff, "IBM eyes new APIs: Reorganization targets object developers enterprisewide," News, LexisNexis, Computerworld, May 30, 1994, pp. 4.

Edventure Holdings, "Component Software: competition between OpenDoc and OLE 2.0: includes related articles on object infrastructures and price Waterhouse's new auditing system," LexisNexis, Gale Group Inc., vol. 94 No. 5, May 25, 1994, pl. 6, pp. 1.

Edventure Holdings, "OpenDoc: the component guild," LexisNexis, Gale Group Inc., vol. 94 No. 5, May 25, 1994, pl. 3, pp. 17.

Newsbytes, "Apple, IBM, Sci-Atlanta Seek Interactive Apps," LexisNexis, Post-Newskeek Business Information Inc, Atlanta, Georgia, May 24, 1994, pp. 1.

Apple Internet Address Detectors User's Manual, Aug. 28, 1997, pp. 1-15.

MacWeek Report, Aug. 8, 1996, 2 pgs.

EMailman(sm) Internet Address Detectors, http://www.emailman.com/mac/iad.html, Jan. 12, 2004, 3 pgs.

MacAddicts at MacWorld, exclusive.gif, 5 pgs, 1996.

Apple Data Detectors, Dec. 30, 1996, 7 pgs.

Welcome to Apple Data Detectors, Apple Data Detectors, Mar. 4, 1997, 19 pgs.

Claris for Macintosh, 62 pages.

Welcome to Apple Data Detectors, Apple Data Detectors, Apr. 8, 1997, 11 pgs.

What are Apple Data Detectors?, JRM (ver 4.0),Copyright © 1997 Apple Computer, Inc., 5 pgs.

The Apple Data Detectors FAQ, JRM (v. 4.0), Copyright © 1997 Apple Computer, Inc., 3 pgs.

Gregory D. Abowd, Anind Dey, Andy M. Wood, Applying Dynamic Integration as a Software Infrastructure for Context-Aware Computing, 10 pgs.

Milind S. Pandit and Sameer Kalbag,The Selection Recognition Agent: Instant Access to Relevant Information and Operations, IUI 97, Orlando Florida USA, © 1997 ACM 0-89791-839-8/96/01, pp. 47-52.

Gregory D. Abowd, Anind K. Dey, Robert Orr & Jason Brotherton, Context-Awareness in Wearable and Ubiquitous Computing, Proceedings of the First International Symposium on Wearable Computers (ISWC '97) 0-8186-8192-6/97 © 1997 IEEE, 3 pgs.

AndrewWood, Anind Dey, Gregory D. Abowd, CyberDesk: Automated Integration of Desktop and Network Services, CHI 97. Atlanta GA USA,Copyright 1997 ACM 0-g9791-802-9/97/03, 2 pgs.

QUALCOMM, Eudora ProTM for Newton®, Version 1.0 for Newton 2.0 and 2.1, pp. 1-22, 1996.

Version 3.1 for Macintosh User Manual, Eudora Mail Light, Apr. 1997 80-8103-3 rev, 190 pgs.

Newton, Apple MessagePad Handbook, pp. 1-358, 1995.

James R. Miller and Thomas Bonura ,From Documents to Objects An Overview of LiveDoc, SIGCHI Bulletin vol. 30, No. 2 Apr. 1998 , pp. 3-58.

James R. Miller and Thomas Bonura ,Drop Zones An Extension, SIGCHI Bullelin vol. 30, No. 2 Apr. 1998, pp. 59-63.

Chris Schmandt, Phoneshell: the Telephone as Computer Terminal, 10 pgs.

Hui Wang, David Bell, John Hughs, Piyush Ojha, Neural network approach to relevance, IEEE, 1995, pp. 1961-1965.

Cara Cunningham, Apple kicks off Macworld with talk of revival, new software demos, InfoWorld Electric, Jan. 11, 2004, 2 pgs.

Writing new detectors for Apple Data Detectors, Copyright © 1997, Apple Computer, Inc., 8 pgs.

Welcome tq.AppleWeb, 1997, 4 pgs.

Apple Data Detectors, Apple Inc., 1997, 4 pgs.

Contextual Menu Manager/Apple Data Detectors, 6 pgs.

Apple Introduces Internet Address Detectors, http://www.apple.com/pr/library/1997/q4/97090S.pr.rel.internet.html ,1997, 44 pgs.

Developer's Guide to Apple Data Detectors, for version 1.0.2, Apple Computer, Inc., Dec. 1, 1997, 34 pgs.

Apple Data Detectors User's Manual, Copyright © 1997 Apple Computer, Inc., 16 pgs.

Communications of the ACM, Mar. 1998—vol. 41, No. 3, 12 pgs.

First International Symposium on Wearable Computers, IEEE, Oct. 13-14, 1997, 8 pgs.

CHI 97 Human Factors in Computing Systems, Mar. 22-27, 1997, 9 pgs.

Proceedings of the ACM Symposium on User Interface Software and Technology, UIST 97, 10th Annual Symposium on User Interface Software and Technology,Oct. 14-17, 1997, 9 pgs.

CyberDesk: A Framework for Providing Self-Integrating Ubiquitous Software Services, Anind K. Dey, Gregory Abowd, Mike Pinkerton, Andrew Wood, 10 pgs.

Milind S. Pandit, Sameer Kalbag, The Selection Recognition Agent: Instant Access to Relevant Information and Operations, Copyright © 1997 ACM 0-89791-839-8/96/01.

Michael David Pinkerton, Ubiquitous Computing: Extending Access to Mobile Data, Georgia Institute of Technology, May 1997, 98 pgs.

1997 International Conference on Intelligent User Interfaces,IU 197 Conference Proceedings, ACM, Jan. 6-9, 1997, 14 pgs.

Proceedings of the Third Annual Conference on Autonomous Agents, ACM, May 1-5, 1999.

Dunn, JM and Stern, EH, Touch-Screen/Graphics Receive Message Application, IBM TDB, IPCOM000111975D Apr. 1, 1994, TDB v37 n4A 04-94 p. 451-454, Mar. 26, 2005, 5 pgs.

Chris O'Malley,Simonizing the PDA, BellSouth's communicative Simon is a milestone in the evolution of the PDA, http://web.archive.org/web/19990221174856/byte.com/a rt/9412/sec11/art3.htm, Dec. 1994, 7 pgs.

Salahshour, A and Williams, ML, Preferred Media Communication Establishment Mechanism, IBM Technical Disclosure Bulletin, vol. 37 No. 03 1994, 3 pgs.

Gregory D. Abowd, Anind K. Dey, and Andrew Wood, Future Computing Environments, Applying Dynamic Integration as a Software Infrastructure for Context-Aware Computing, Cyberdesk, 1998, 17 pgs.

Gregory D. Abowd, Anind K. Dey, Gregory Abowd, Robert Orr & Jason Brotherton, Future Computing Environments , Context-Awareness in Wearable and Ubiquitous Computing, 1997, 15 pgs.

Anind K. Dey, Gregory D. Abowd, Future Computing Environments ,PUI Workshop Submission, CyberDesk: The Use of Perception in Context-Aware Computing, 5 pgs.

James Staten, Special Report Apple Looks to the Future, James Staten, Ziff-Davis Publishing, Aug. 7, 1996, 2 pgs.

Mike Langberg, Show of Potential Apple Breaks New Ground by Displaying What's on Its Drawing Board "Innovation is at the Heart of What We Do", Aug. 7, 1996, San Jose Mercury News, 2 pgs.

Apple Introduces Internet Address Detectors, Technology Makes It Easier to Manage and Perform Actions with Internet Addresses; Extends Innovative Capabilities Delivered with Mac OS 8, http://www.apple.com/pr/library/1997/q4/970908.pr.rel.internet.html,Sep. 8, 1997, 3 pgs.

The AppleScript Sourcebook—AppleScript Editors, AppleScript Editors, Utilities & Environments, Tools for creating and using AppleScript scripts, including editors, application generators, utilities, and command-line, menu and button bar execution environments, webmaster@applescriptsourcebook.com, http://www.AppleScriptSourcebook.com/links/applescripteditors.html, Oct. 13, 2002, 6 pgs.

ADD Depot, http://web.archive.org/web/20000819081818/http://homepage.mac.com/matthewmiller/add, 4 pgs, Jan. 12, 2004.

Thomas Bonura and James R. Miller ,Drop Zones, An Extension to LiveDoc, http://www.acm.org/sigchi/bulletin/1998.2/bonura.html ,SIG CHI, vol. 30, No. 2, Apr. 1998, 9 pgs.

Thomas Bonura and James R. Miller ,From Documents to Objects, An Overview of LiveDoc, SIGCHI Bulletin vol. 30 No. 2, Apr. 1998: From Documents to Objects, SIG CHI, vol. 30, No. 2, Apr. 1998, 11 pgs.

Bonnie A. Nardi, James R. Miller, and David J. Wright, Collaborative,Programmable Intelligent Agents, Mar. 1998/vol. 41, No. 3 Communications of the ACM, pp. 96-104.

A Farewell to the Apple Advanced Technology Group, http://www.acm.org/sigchi/bulletin/1998.2/, SIG CHI, vol. 30, No. 2, Apr. 1998, 3 pgs.

Apple Internet Address Detectors User's Manual, Aug. 28, 1997, 16 pgs.

Anind K. Dey, Future Computing Environments, Context-Aware Computing: The CyberDesk Project, Mar. 23-25, 1998, 9 pgs.

Anind K. Dey , Gregory D. Abowd, Mike Pinkerton, and Andrew Wood, Future Computing Environments, CyberDesk: A Framework for Providing Self-Integrating Ubiquitous Software, 1997, 18 pgs.

Apple Introduces Internet Address Detectors, Technology Makes it Easier to Manage and Perform Actions with Internet Addresses; Extends Innovative Internet CapabiUties Delivered with Mac OS 8, Sep. 8, 1997, 44 pgs.

Newton 1995 Manual, 1 pg.

\* cited by examiner

| S | Reduction 0 -> a |
| 1 | Reduction 1 -> a |
| 2 | Reduction 0 -> b |
| 4 | Reduction 3 -> E |
| 5 | Reduction 1 -> b |

DATA DETECTION

BACKGROUND OF THE INVENTION

1. Field of the Invention

The present invention relates to methods, systems and articles of manufacture for detecting useful data from blocks of text or sequences of characters.

2. Description of the Background Art

Various methods of detecting data in text are well-known. For example, such methods can be used to analyse bodies of text, such as e-mails or other data received by or input to a computer, to extract information such as e-mail addresses, telephone and fax numbers, physical addresses, IP addresses, days, dates, times, names, places and so forth. In one implementation, a so-called data detector routinely analyses incoming e-mails to detect such information. The detected information can then be extracted to update the user's address book or other records.

Known methods of detecting data include pattern detection methods. Such a method may analyse a body of text to find patterns in the grammar of the text that match the typical grammar pattern of a data type that the method seeks to identify. In general, in such a method, a grammatical function is assigned to each block, such as a word, in the text. The method then compares sequences of grammatical functions in the text to predetermined patterns of functions, which typically make up the types of data to be detected. If a match is found, the method outputs the blocks corresponding to the sequence of grammatical functions as the detected data.

As an example, such a method may assign a single digit from 0 to 9 followed by a space with the function DIGIT; two or more digits with the function NUMBER; two or more letters adjacent with the function WORD; and so forth. Once the functions have been assigned, patterns can be detected. For example, an associated name and address may have the pattern of neighbouring functions: NAME, COMPANY, STREET, POSTAL_CODE, STATE, where some of the functions may be optional.

Such pattern detection methods have generally proven highly effective. However, there remain difficulties in correctly picking out names of organisations and some addresses from bodies of text, as well as in matching all names to an address.

Known methods of detecting data also include statistical learning methods. In general, in such a method a computer program is trained to locate and classify atomic elements in text into predefined categories based on a large corpus of manually annotated training data. Typically, the training data consists of several hundred pages of text, carefully annotated to identify desired categories of data. Thus, in the corpus, each person name, organization name, address, telephone number, e-mail address, etc must be tagged. The program then scans the annotated text and learns how to identify each category of data. Following this training stage, the program may process different bodies of unannotated text and pick out data of the desired categories.

Such methods are heavily reliant on both the text chosen for the training corpus and the accuracy with which it is annotated, not to mention the algorithm by which the program learns. In addition, such programs output as a result all the data matching a particular category. For example, although such programs are particularly successful in identifying complete addresses, they cannot then output the individual elements of a detected address. Accordingly, they are unable to output the street line of an address as a distinct component going to make up the whole address.

SUMMARY OF THE INVENTION

The present invention provides a method, an article of manufacture and a system for detecting data in a sequence of characters or text using both a statistical engine and a pattern engine. The statistical engine is trained to recognize certain types of data and the pattern engine is programmed to recognize the grammatical pattern of certain types of data.

The statistical engine may scan the sequence of characters to output first data, and the pattern engine may break down the first data into subsets of data. Alternatively, the statistical engine may output items that have a predetermined probability or greater of being a certain type of data and the pattern engine may then detect the data from the output items and/or remove incorrect information from the output items.

In another variation, the statistical engine scans the text and outputs a series of tokens with respective token types, which are parsed by a parser of the pattern engine. Alternatively, the pattern engine may further comprise a lexer, which also scans the data and outputs a series of tokens with respective token types. The tokens from the statistical engine and the pattern engine are parsed by the parser of the pattern engine. As a further alternative, the statistical engine outputs some tokens and forwards them together with the remaining unchanged text to the lexer. The lexer converts the remaining text into tokens and the resultant stream of tokens, including tokens from both the statistical engine and the pattern engine, are parsed.

The present invention makes use of the advantageous aspects of statistical engines and pattern engines respectively, and minimizes their drawbacks. In particular, the present invention makes it possible to more quickly and accurately detect combinations of the various elements of contact details, such as names, physical addresses (including eastern addresses, such as Chinese and Japanese addresses), e-mail addresses, phone numbers, fax numbers and so forth. The various elements of the names and addresses are decomposed so they are particularly suited for future use by a user.

BRIEF DESCRIPTION OF THE DRAWINGS

Embodiments of the present invention will now be described by way of example only with reference to the accompanying drawings in which.

DETAILED DESCRIPTION

Figure 1:
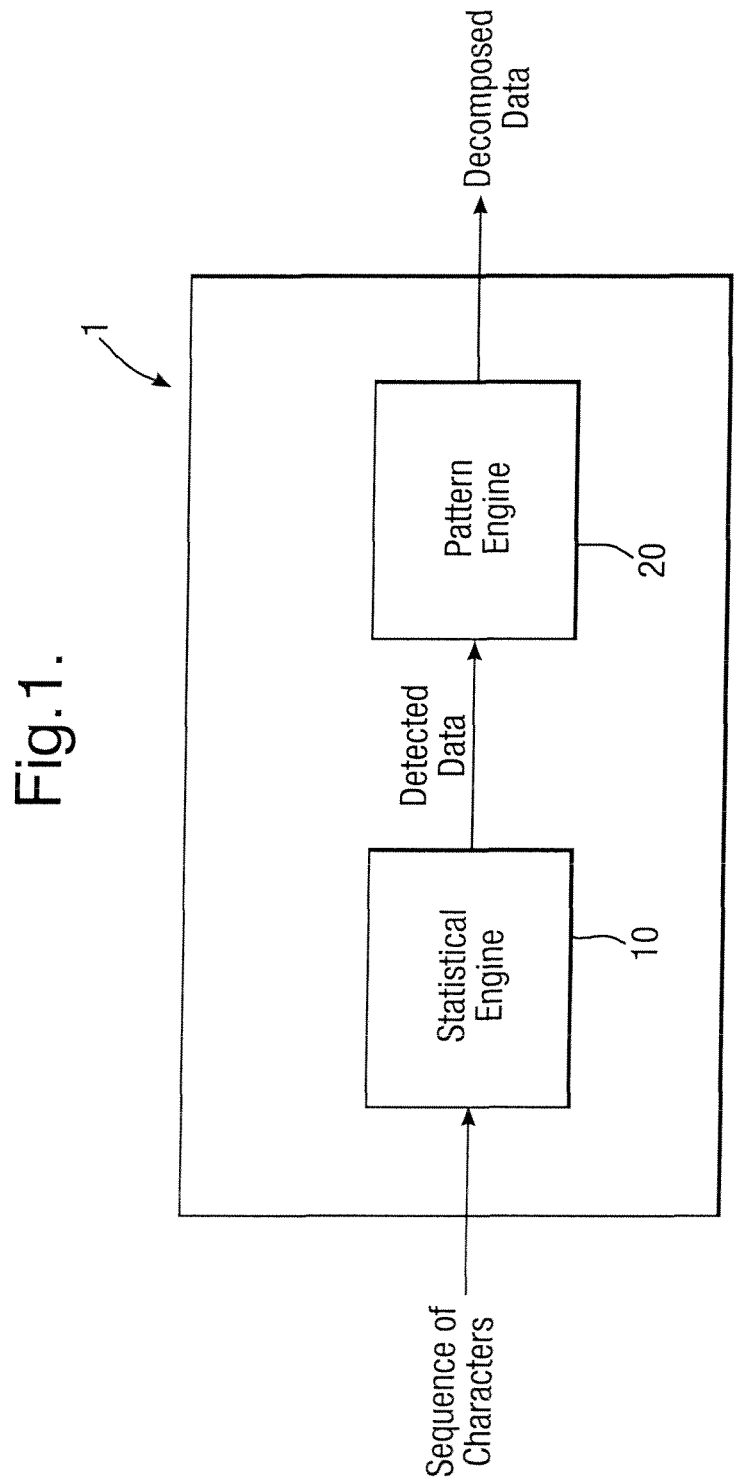
FIG. 1 is a schematic illustration of a combination engine according to an embodiment of the present invention.

FIG. 1 schematically illustrates a combination engine 1 of the present invention, which can be embodied in a processor. The combination engine 1 comprises a statistical engine 10 in series with a pattern engine 20.

The statistical engine 10 is an adaptation of a known statistical engine of any suitable type. The statistical engine has been trained using a previously annotated corpus in a desired language and including text of the types of data intended to be detected. After the text of the corpus has been chosen and annotated, one of a large variety of different statistical machine learning techniques is used to teach the statistical engine 10 to extract desired types of data from input text, together with a tag describing the output data, based on the annotated corpus. In general, the annotations in the training corpus will match the tags output with the data.

There are many well-known techniques for teaching a statistical model to map between input text and output data. One example is the maximum entropy method, but any other suitable technique may also be used.

In the present embodiment, once the statistical engine 10 has been taught, it receives text input in the form of a sequence of characters. There is no limitation on what characters can make up the text. It is important to recognise that at this stage no further teaching is required, although the engine 10 may continue to learn in alternative embodiments of the invention. As such, the statistical engine 10 may be a pre-taught engine imported into the combination engine 1 without the facility for further learning.

The statistical engine 10 parses the input characters and calculates a likelihood that blocks of text within the sequence of characters make up data of a type that is being sought. For example, the statistical engine 10 will calculate whether a block of text forms a name, an address, or the like. If the calculated likelihood is greater than a predetermined threshold, the statistical engine 10 outputs the block to the pattern engine 20 together with a tag for the block.

For example, assume that a statistical engine has been trained to detect quantities, person names, organisation names and addresses, and receives as the text input the following e-mail:

"Jon, I am considering buying 300 shares in Acme Inc. Before I make the purchase, please contact Wilson Nagai, Graebel Broking Services Worldwide, 16346 E. Airport Circle, Aurora, Colo. 80011, USA to get his advice".

Figure 2:
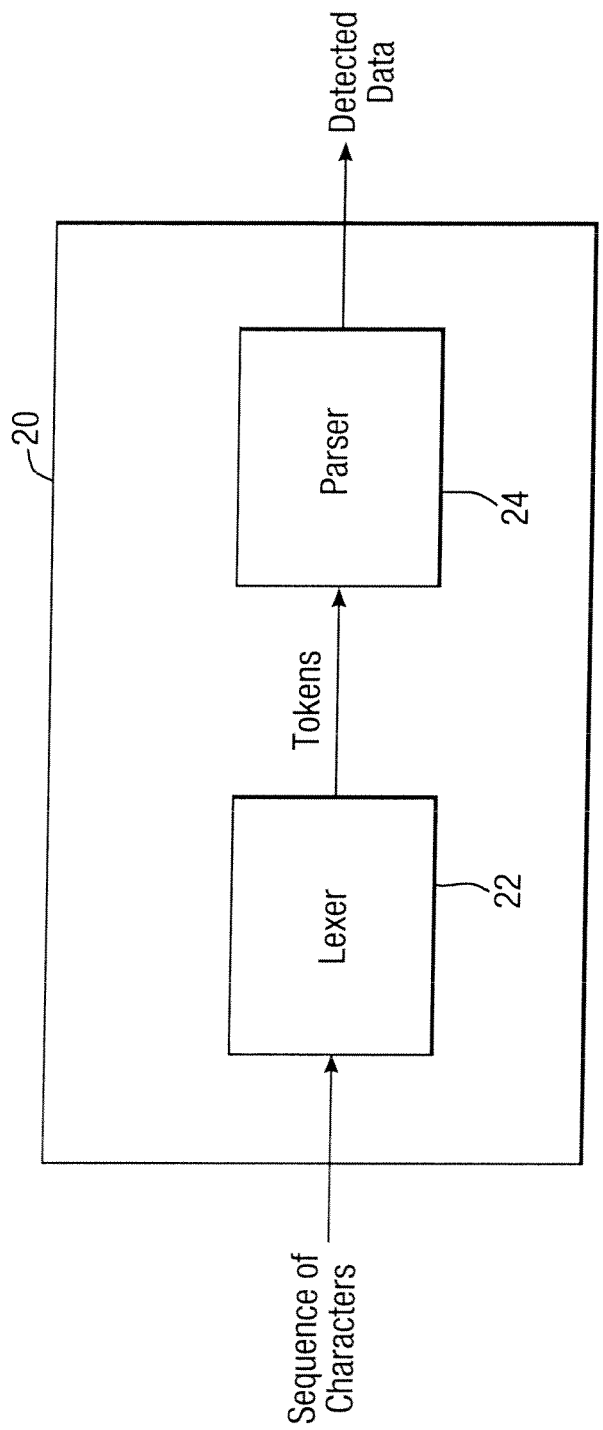
FIG. 2 is a schematic illustration of a pattern engine according to an embodiment of the present invention.

The statistical engine will output <tags> and blocks of text, having determined that the probability of accurate output is greater than a predetermined threshold of, for example, 90%, as follows:

<person name>Jon
<quantity>300 shares
<organisation name>Acme Inc.
<person name>Wilson Nagai
<address>Graebel Broking Services Worldwide, 16346 E. Airport Circle, Aurora, Colo. 80011, USA FIG. 2 shows a schematic representation of the pattern engine 20. In the present invention, the pattern engine 20 determines the grammatical structure of the text to pick out the predetermined data. More specifically, the pattern engine 20 uses the statistical modeling of data to determine which grammatical patterns relate to which types of information. For example, a statistical model may show that a time always has the pattern of a meridian (am or pm) followed by two digits. Similarly, it may show that a bug identification always has the grammatical pattern of two letters followed by four numbers. In this example, the pattern engine would be programmed so that if it detects a meridian followed by two digits, it will output them as a time, and if it detects two initials followed by four digits, it will output them as a bug identification.

The pattern engine 20 comprises a lexical analyser or lexer 22 and a parser 24. The lexer 22 receives as its input a sequence of characters. The lexer 22 stores a vocabulary that allows it to resolve the sequence of characters into a sequence of tokens. Each token comprises a lexeme (analogous to a word) and a token type (which describes its class or function).

As mentioned above, in the present example, the format of a time to be detected is that it is always one of AM or PM followed by two digits, whereas the format of a bug identification code to be detected is always two letters followed by three digits. Accordingly, the lexer 22 may be provided with the vocabulary:

| | |
|---|---|
| INITIALS: = [A-Z]{2} | (INITIALS is any two letters together) |
| MERIDIAN: = (A|P)M | (MERIDIAN is the letter A or the letter P, followed by the letter M) |
| DIGIT: = [0-9] | (DIGIT is any character from 0 to 9) | whereas the parser 24 may be provided with the grammar:

| | |
|---|---|
| BUG_ID:= INITIALS DIGIT{3} | (INITIALS token followed by 3 DIGIT tokens) |
| TIME: = MERIDIAN DIGIT{2} | (MERIDIAN token followed by 2 DIGIT tokens) |

In more detail, the lexer will output a sequence of a letter from A to Z followed by another letter from A to Z as a token having a lexeme of the two letters and having the token type INITIALS. It will also output the letters AM and PM as a token having the token type MERIDIAN. The processing of a sequence of characters to output tokens and respective token types, and the processing of tokens and token types to output sought data can be performed using decision trees.

As another example, a parser may be provided with the grammar
ADDRESS: =name? company? street
In this notation, '?' indicates that the preceding token need not be present. Accordingly, to detect an address, it is only necessary for a street to be present, a name and/or a company in front of the street being optional. Thus, an epsilon reduction is required for both the name and company. Using the token types a, b and c, the grammar can be rewritten as
a: =name|$\epsilon$
b: =company|$\epsilon$
c: =street
ADDRESS: =a b c
where $\epsilon$ signifies 'nothing'.

Figure 3:
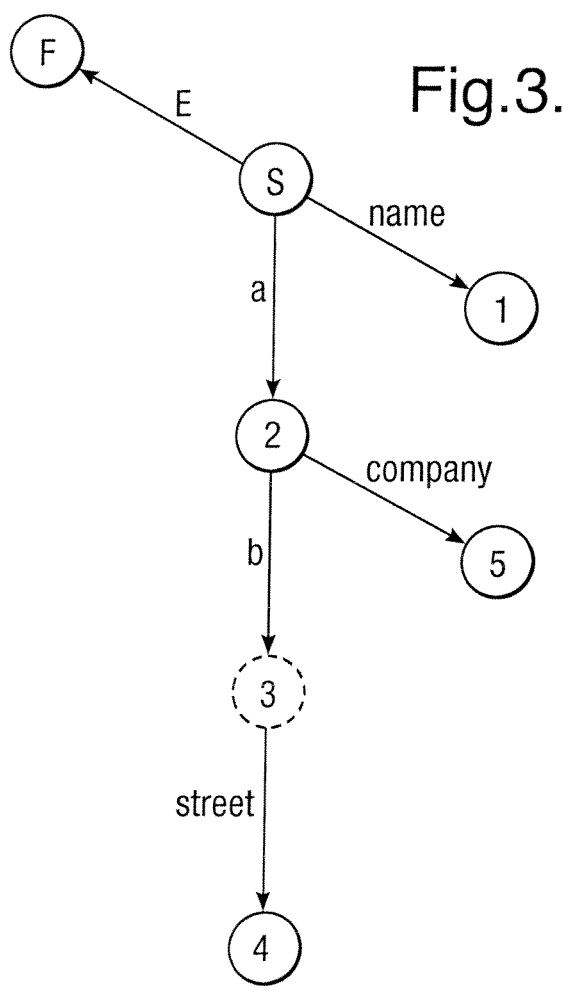
FIG. 3 shows a decision tree of a parser according to an embodiment of the present invention.

FIG. 3 shows a corresponding decision tree for the parser, which determines that an address has been detected when it reaches state F. In this case, the fact that the "name" token is optional is handled by the path from the starting state S to state 1, the reduction for state 1 and the epsilon reduction for starting state S. Similarly, the fact that the "company" token is optional is handled by the path from state 2 to state 5, the reduction for state 5 and the epsilon reduction for state 2.

As a further example, assume that a pattern engine has been programmed to detect quantities, person names, organisation names and addresses, and also receives as the text input the following e-mail:

"Jon, I am considering buying 300 shares in Acme Inc. Before I make the purchase, please contact Wilson Nagai, Graebel Broking Services Worldwide, 16346 E. Airport Circle, Aurora, Colo. 80011, USA to get his advice".

The pattern engine may output the <tags> and blocks of text, having determined that blocks of text match the pre-programmed pattern:

<person name>Jon
<number>300
<organisation name>Acme Inc.
<person name>Wilson Nagai
<address>(<<company name>>Broking Services Worldwide<<street>>16346 E. Airport Circle<<town>>Aurora<<state>>CO<<postal code>>80011<<country>>USA)

Here, it can be seen that the pattern engine, unlike the statistical engine of the foregoing example, is unable to detect that the number 300 relates to a quantity of something, as opposed to any other number. Similarly, the pattern engine has incorrectly extracted the address, referring to "Broking Services Worldwide" instead of "Graebel Broking Services Worldwide". This could be because the lexer has output a token having the lexeme "Graebel" with an incorrect token type, or the grammar of the parser only recognises company names of three words or less.

Thus, a fundamental difference between a statistical engine and a pattern engine is that a statistical engine has been trained, using an extensive training corpus, to determine the likelihood that blocks of characters within a sequence of characters make up data of the type being sought, whereas a pattern engine has algorithms for comparing grammatical patterns within the sequence of characters with preset patterns in a vocabulary and grammar predetermined by the programmer. In general, either these preset patterns are matched or not.

In the present specification, the terms "pattern engine", "pattern detection method", "statistical engine" and "statistical detection method" should be construed accordingly.

Consequently, the output of a statistical engine can be changed by varying a probability threshold, whereas the output of a pattern engine can only be changed by varying the pre-programmed grammatical patterns—that is, by changing the vocabulary and the grammar of the pattern engine. In general, a statistical engine recognises certain types of data, particularly names and some form of physical address, more accurately than a pattern engine and is easier to adapt, by changing the probability threshold and by using different training corpuses. Processing is also generally faster. However, it outputs the detected data in a less useful way.

Figure 4:
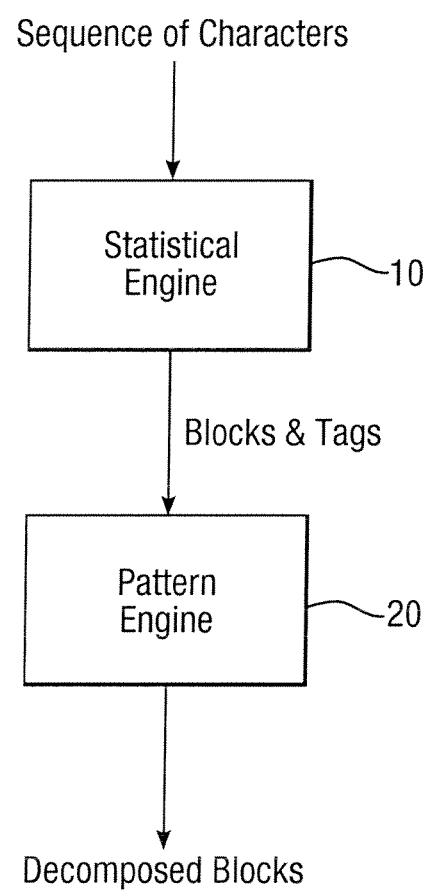
FIG. 4 is a schematic illustration of a text decomposition process according to an embodiment of the present invention.

In this embodiment of the present invention, a sequence of characters is input to the combination engine 1 and is first processed by the statistical engine 10. The statistical engine outputs a series of blocks of text, each representing detected data, together with a tag for each block, indicating the type of data that has been detected, as shown in FIG. 4.

The pattern engine 20 receives the blocks and associated tags from the statistical engine 10 and processes each one in turn. Note that large amounts of spurious or useless data will have been removed by the statistical engine 10, thereby considerably reducing the amount of processing required by the pattern engine 20. In the present embodiment, it is accepted that the statistical engine 10 has output correct and complete data and the function of the pattern engine 20 is to decompose that data if possible.

Accordingly, the pattern engine 20 receives and processes each block of text separately. For example, assume that the statistical engine 10 outputs <person name>Jon
gap
<quantity>300
gap
<organisation name>Acme Inc.
gap
<person name>Wilson Nagai
<address>Graebel Broking Services Worldwide, 16346 E. Airport Circle, Aurora, Colo. 80011, USA The pattern engine 20 processes each of the above blocks individually, but is adapted to recognise that all lexemes in a block of text are useful and cannot be discarded. In the event of conflict between the results of the statistical engine 10 and the pattern engine 20, the results of the statistical engine prevail.

In this example, the pattern engine 20 is not able to decompose the block of text "Jon" and accordingly will simply output "Jon" as a person name, in accordance with the determination made by the statistical engine 10. Similarly, the pattern engine 20 is unable to determine the data type of the number "300" and will therefore output the number "300" as a quantity in accordance with the tag assigned by the statistical engine 10. Similar considerations apply in respect of the person name "Wilson Nagai".

Further, the pattern engine 20 will process the sequence of characters "Graebel Broking Services Worldwide, 16346 E. Airport Circle, Aurora, Colo. 80011, USA" and output it as an address, in line with the output of the statistical engine, but further tagged as <Company Name>Graebel Broking Services Worldwide; <Street>16346 E. Airport Circle; <Town>Aurora; <State>CO; <Postal Code>80011; <Country> USA.

Note here that the grammar of the parser 24 is forced to append the previously redundant lexeme "Graebel" to the company name in order to avoid conflict with the statistical engine. Thus, the statistical engine 10 can be termed the master engine and the pattern engine 20 can be termed the subordinate engine.

One way in which the grammar of the parser 24 may be forced to properly append the previously redundant lexeme is to provide a score for all patterns recognised by the parser 24. Matched "fuzzy" patterns can be provided with lower scores than less "fuzzy" (or harder) patterns to reflect the fact that the "harder" patterns are more likely to relate to types of data that are being sought. The parser 24 may lower the minimum acceptable score for a matched pattern until all the names/lexemes from the statistical engine have been matched. In this way, correct pattern matches are more likely to be output but the parser will still be forced to use all the information output from the statistical engine 10.

The decomposition of the address field in this way has the advantage that the address data is more useful. For example, where the tags match fields provided in a contacts address book, the address can be automatically added to a contacts address book with the appropriate parts of the address being entered into the fields provided by the address book. Moreover, where an address is provided on one line in a body of text, the decomposition of the address allows it to be automatically used in the proper format on a later occasion, for example when using the address in a letter or to prepare a label for an envelope.

In a second embodiment of the present invention, processing is again carried out first by a statistical engine 10 and then by a pattern engine 20. However, in this case, the threshold of the statistical engine 10 is set to be low. This means that the statistical engine will output all data that has even a low probability of matching the type of data being sought—e-mail addresses, telephone and fax numbers, physical addresses, IP addresses, days, dates, times, names and places for example. Consequently, it can be expected that in practice a significant amount of the output data is not in fact of the type being sought.

Figure 5:
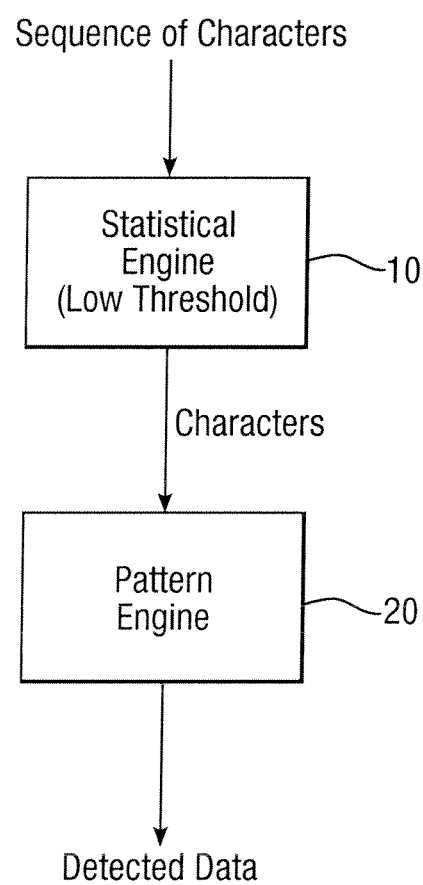
FIG. 5 is a schematic illustration of a text decomposition process according to an embodiment of the present invention.

Subsequently, as shown in FIG. 5, the data output by the statistical engine 10 is input to the pattern engine 20 as a sequence of characters, optionally without any tags but in any case with an indication where breaks in the text occur due to removal of text not meeting the probability threshold. This indication of breaks prevents the pattern engine from falsely linking a name to an address where, in the original text, the name and the address are spaced apart by intermediate text that has been removed by the statistical engine 10.

The pattern engine 20 then processes the sequence of characters received from the pattern engine in the normal manner and outputs the results as normal. In this case, the pattern engine 20 is the master engine to the extent that it is primarily responsible for extracting correct information. Put another way, the statistical engine 10 extracts possibly relevant regions of the text and the pattern engine 20 then scans only those regions. The advantage of the present embodiment is that the quick processing of the statistical engine can be used to filter out most of the spurious information in large bodies of text, for example of several hundred pages, before the more computationally expensive pattern engine processes the remaining data, which has a greater chance of being relevant, to provide accurate output data in a useful format.

The precise percentage threshold may be any suitable percentage to remove the majority of spurious data and is preferably in the range between 1% and 20%. More preferably, it falls within the range 3% to 10%, and most preferably is 5%.

Figure 6:
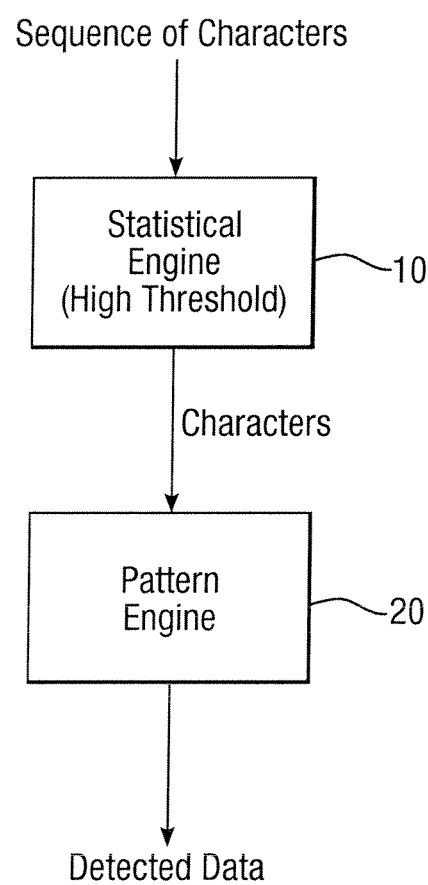
FIG. 6 is a schematic illustration of a text decomposition process according to an embodiment of the present invention.

A third aspect of the present invention is similar to the second aspect and is schematically illustrated in FIG. 6. However, in this case the probability threshold of the statistical engine 10 is set to be higher, with the aim that most of the output data from the statistical engine 10 is indeed data of the type sought by the combination engine 1. The output of the statistical engine 10 is again sent to the pattern engine 20 as a sequence of characters, optionally without any tags but in any case with an indication where breaks in the text are. Again, this indication of breaks prevents the pattern engine 20 from falsely linking a name to an address where in the original text the name and the address are spaced apart by intermediate text that has been removed by the statistical engine 10.

The pattern engine 20 then processes the sequence of characters received from the statistical engine 10 in the normal manner and outputs the results. In this case, the statistical engine 10 can be considered the master engine since it is the engine primarily responsible for deciding whether data in the sequence of characters matches the sought data. Thus, the pattern engine does not have an opportunity to process text that does not have a high probability of being the data sought after. Rather, the pattern engine 20 is used to filter out false positives that may be output by the statistical engine 10.

For example, assume that the sequence of characters input to the statistical engine 10 is an e-mail thread including lower down the thread the question "I am going to the electronics shop. Is there anything you would like me to get?" and higher up the thread the reply "1 GB Disc Drive". The statistical engine 10 has a high probability of outputting "1 GB Disc Drive" as an address. However, the pattern engine would recognise that the expression "Disc Drive" does not form part of an address and would not extract the expression "1 GB Disc Drive" as an address. In this manner, the pattern engine 20 invalidates the result output from the statistical engine 10 by recognising elements of an address and ruling others out. The same technique can be used to prevent numbers in certain formats from being recognised as telephone numbers, for example. Other applications will also be recognised by those skilled in the art. Accordingly, in the present embodiment, the stricter grammar rules of the pattern engine 20 are used to prevent the combination engine 1 from outputting false positives identified by the statistical engine 10.

The precise percentage threshold adopted for the statistical engine 10 in this embodiment may be any suitable percentage such that the majority of output data is in practice sought data and is preferably in the range between 50% and 100%. More preferably, it falls within the range 70% to 90%, and most preferably is 80%.

Figure 7:
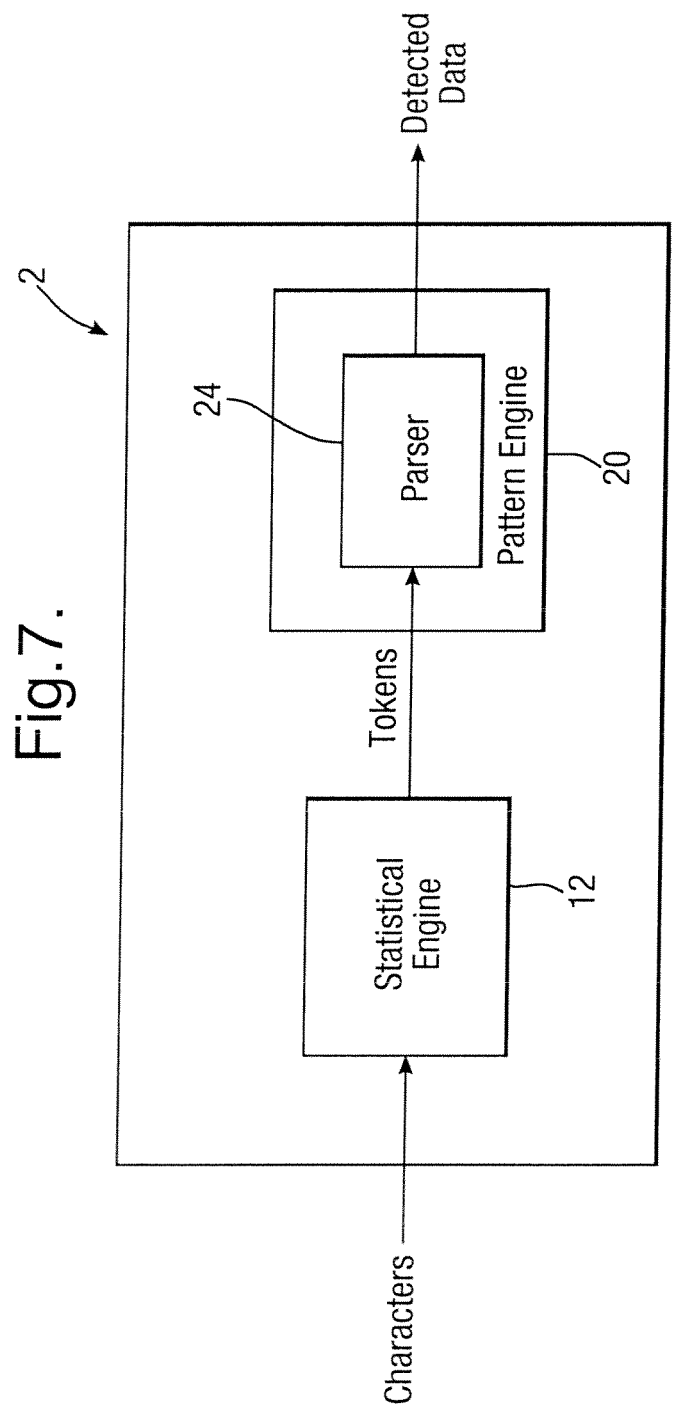
FIG. 7 is a schematic illustration of a combination engine according to an embodiment of the present invention.

In a yet further embodiment of the present invention, the combination engine is modified as shown in FIG. 7. In particular, FIG. 7 shows a combination engine 2 comprising a modified statistical engine 12 and a modified pattern engine 26 in which the lexer 22 has been removed. The character sequence is again processed first by the statistical engine 12 and the resultant output is processed directly by the parser 24 of pattern engine 26. However, in this case, the statistical engine 12 is trained to output tokens having a lexeme and a token type which can then be processed by the pattern engine 20. Thus, instead of outputting the sequence of characters "Graebel Broking Services Worldwide, 16346 E. Airport Circle, Aurora, Colo. 80011, USA" as an address, as with the statistical engine 10 in the previous embodiments, the statistical engine 12 is instead trained to output the tokens:

| | |
|---|---|
| lexeme: Graebel Broking Services Worldwide; | token type: organisation name |
| lexeme: 16346 E. Airport Circle; | token type street |
| lexeme: Aurora; | token type: town |
| lexeme: CO; | token type: state |
| lexeme: 80011; | token type: postal code |
| lexeme: USA; | token type: country |

In this manner, the statistical engine acts in place of the lexer 22 of the combination engine 1. The parser 24 then parses the tokens and establishes whether the sequence of token types matches any of the predetermined patterns stored in its grammar. In this way, the combination engine will correctly output the address, including the correct organisation name, but decomposed into a more useful format than could be output by the statistical engine 10 alone.

Figure 8:
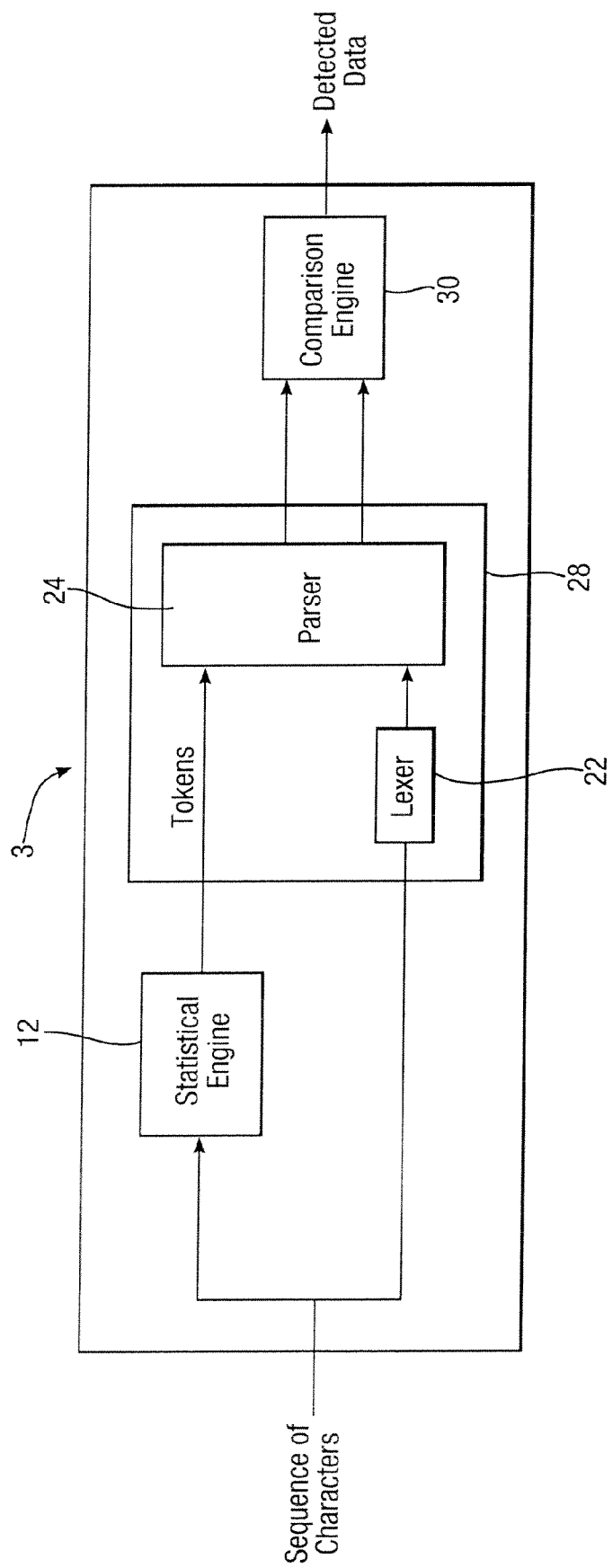
FIG. 8 is a schematic illustration of a combination engine according to an embodiment of the present invention.

In a still further embodiment of the present invention, the combination engine is modified as shown in FIG. 8. In particular, FIG. 8 shows a combination engine 3 comprising the modified statistical engine 12 and a modified pattern engine 28 in which the lexer 22 and the parser 24 are included. The character sequence is input simultaneously to the statistical engine 12 and the lexer 22. Similarly to above, the statistical engine 12 is trained to output tokens having a lexeme and a token type which can be processed by the parser 24 of the pattern engine 28. In addition, in the normal manner, the lexer 22 outputs tokens having lexemes and token types in accordance with the vocabulary of the lexer 22. The streams of tokens output by the statistical engine 12 and the lexer 22 are both parsed separately by the parser 24. Accordingly, the parser 24 outputs two sets of data, each purporting to be data of the type sought by the combination engine 3. The two sets of data are input to a comparison engine 3, which compares them and provides a final output of the detected data from the comparison engine 3.

It will be appreciated by persons skilled in the art that there are numerous ways in which the comparison engine 30 might operate. However, the present inventors have recognised that in general the statistical engine 10 detects names more accurately than the pattern engine 20 since it is difficult to describe names in terms of patterns. Indeed, in some approaches, pattern engines 20 consider any word starting with an upper case to be a name. This is a "fuzzy" means of recognising a name and can easily give incorrect outputs.

Accordingly, it is preferred that if an item of data detected based on the tokens produced by the statistical engine 12 is the same as an item of data detected based on the tokens produced by the lexer 22, the comparison engine 30 detects this and outputs the data as a single item with the appropriate tag. If an item of data detected based on the tokens produced by the statistical engine 12 is different to an item of data detected based on the corresponding tokens produced by the lexer 22 (in other words tokens resulting from the same characters of the initially input sequence of characters), the comparison engine 30 will determine which item to output based on the tag assigned to the items. For example, if both items are assigned with an address tag, the comparison engine will output only the item of data detected based on the tokens produced by the lexer 22. By contrast, if both items are assigned with a name tag, the comparison engine will output only the item of data detected based the tokens produced by the statistical engine 12. If the stream of tokens from one of the statistical engine 12 and the lexer 22 results in an item that is not output based on the stream of tokens from the other of the statistical engine 12 and the lexer 22, the comparison engine 30 outputs the item anyway, unless the item is a name based on the stream of tokens from the lexer 22.

In this manner, the statistical engine 12 acts in tandem with the lexer 22 of the combination engine 3. The parser 24 then parses the tokens from both and establishes whether either sequence of token types matches any of the predetermined patterns stored in its grammar. In this way, the combination engine will correctly output the address, including the correct organisation name, but decomposed into a more useful format than could be output by the statistical engine 10 alone.

Figure 9:
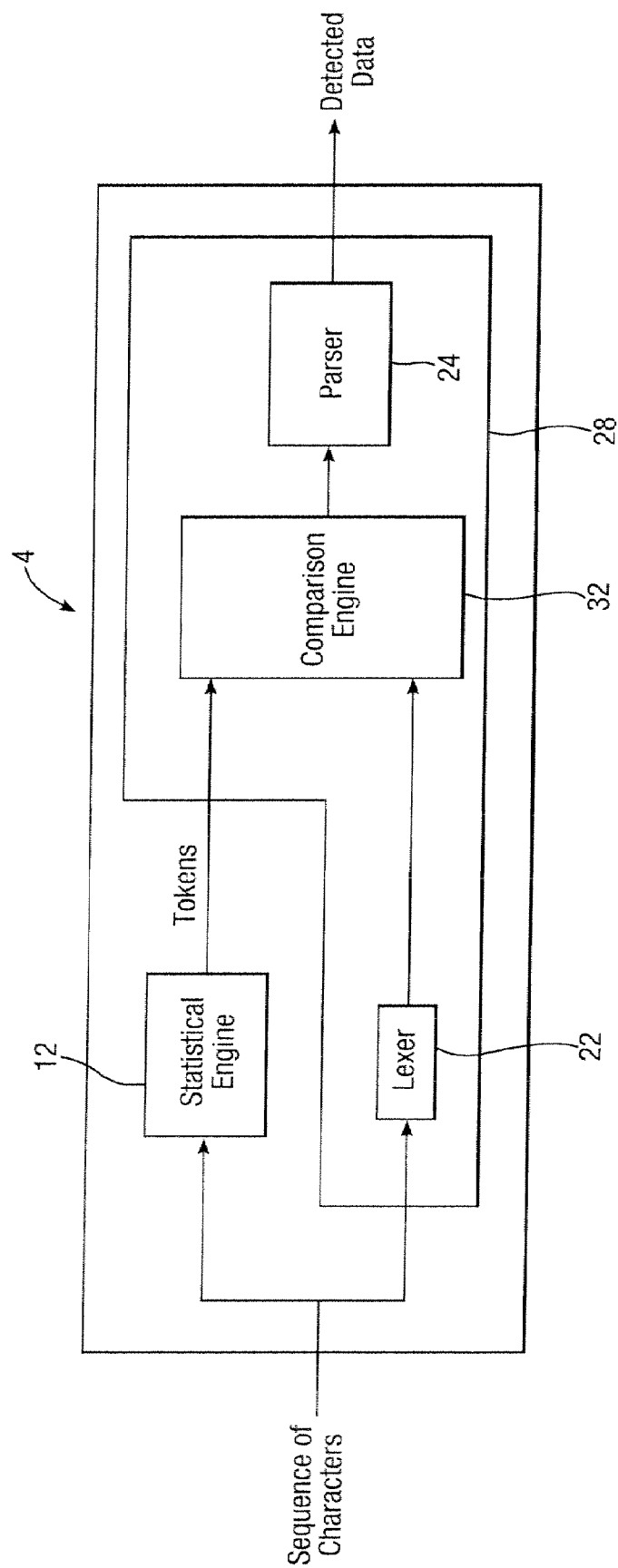
FIG. 9 is a schematic illustration of a combination engine according to an embodiment of the present invention.

A modification of this embodiment is shown in FIG. 9. In the combination engine 4 of FIG. 9, a comparison engine 32 is provided with inputs from the statistical engine 12 and the lexer 22 and provides an output to the parser 24. As in the previous embodiment, the statistical engine 12 and the lexer 22 both output sequences of tokens, each having a lexeme and a token type. The token types that can be output by the statistical engine 12 are the same as those that can be output by the lexer 22. The comparison engine 32 compares the tokens output by the statistical engine 12 and the lexer 22 and decides which tokens to output to the parser 24. In the event that a token from the statistical engine 12 is the same as a corresponding token provided by the lexer 22, the comparison engine outputs only one of said tokens to the parser 24. However, the comparison engine 32 is also provided with a series of rules in the event that corresponding tokens are different, having a different lexeme and/or a different token type. Such rules will ensure that only one of the tokens is output or that both tokens are output to the parser 24 as required.

In a further refinement, certain tokens can be assigned more or less weight depending on which engine they come from. The comparison token would choose only the token with the highest weight. For example, a 'name' token would have a low weighting if it originates from the lexer 22 and high weight if it originates from the statistical engine 10.

Figure 10:
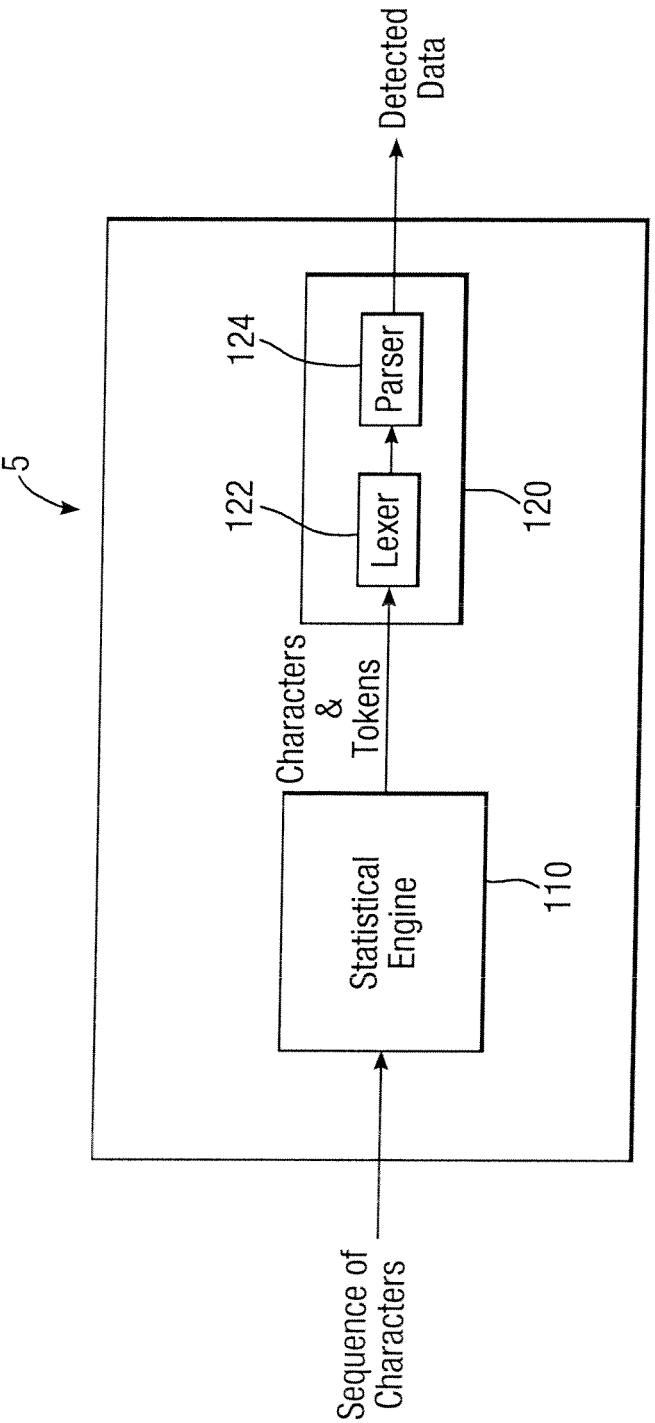
FIG. 10 is a schematic illustration of a combination engine according to an embodiment of the present invention.

In a preferred embodiment, a combination engine 5 comprises a statistical engine 110 and a pattern engine 120, as shown in FIG. 10. The statistical engine 110 is trained to detect types of data that are difficult to accurately detect by a pattern engine and to output such data as tokens having lexemes and token types. The grammar of the parser 124 is adjusted to be able to process the tokens output by the statistical engine 110 in addition to the tokens output by the lexer 22 in the usual manner.

In this embodiment, the statistical engine 110 operates on the sequence of characters first. Where it detects data of the type it is trained to detect, the statistical engine 110 will output that data as a token. However, it will leave the remaining data unchanged. Accordingly, the lexer 122 receives as an input from the statistical engine 110 the original sequence of characters, but with portions of it having been converted to tokens. The lexer 122 processes the sequence of characters with the interspersed tokens. The sequence of characters is processed in the usual manner, but the tokens inserted by the statistical engine 110 are unaffected. Accordingly, the parser 124 receives as its input a sequence of tokens from the lexer 122, including tokens created by both the statistical engine 110 and the lexer 122 and processes the sequence in the usual manner.

For example, the statistical engine 120 may be trained to detect person and organisation names only and to output corresponding PersonName and OrgName type tokens. By contrast, the lexer 122 may be programmed to output Street, Town, State, Postal_Code, Country and Telephone_Number type tokens but not name type tokens. The grammar of the parser 124 may have its grammar adjusted to detect an address as:

Address:=PersonName? OrgName? Street Town State? Postal_Code? Country?

Imagine the statistical engine 120 receives as its input the sequence of characters:

"Jon, I am considering buying 300 shares in Acme Inc. Before you make the purchase, please contact Wilson Nagai, Graebel Broking Services Worldwide, 16346 E. Airport Circle, Aurora, Colo. 80011, USA, Tel 801 234 7771"

It might output:

(TOKEN: LEX Jon; TYPE PersonName), I am considering buying 300 shares in (TOKEN: LEX Acme Inc; TYPE OrgName). Before you make the purchase, please contact (TOKEN: LEX Wilson Nagai; TYPE PersonName), (TOKEN: LEX Graebel Broking Services Worldwide; TYPE OrgName), 16346 E. Airport Circle, Aurora, Colo. 80011, USA, Tel 801 234 7771

This sequence is in turn input to the lexer 122 of the pattern engine 120, which might output to the parser 124 the sequence of tokens:

LEX Jon; TYPE PersonName
LEX I am considering buying; TYPE Miscellaneous
LEX 300; TYPE Number
LEX shares in; TYPE Miscellaneous
LEX Acme Inc; TYPE OrgName
LEX Before you make the purchase, please contact; TYPE Miscellaneous
LEX Wilson Nagai; TYPE PersonName
LEX Graebel Broking Services Worldwide; TYPE OrgName
LEX 16346 E. Airport Circle TYPE Street
LEX Aurora; TYPE Town
LEX CO; TYPE State
LEX 80011; TYPE Postal-Code LEX USA; TYPE Country
LEX 801 234 7771; TYPE Phone_no
Given the grammar Address: =PersonName? JobTitle? OrgName? StreetTown State? Postal_Code? Country?, the parser 124 will parse this series of tokens to output the address:
Wilson Nagai
Graebel Broking Services Worldwide
16346 E. Airport Circle
Aurora
CO
80011
USA
with each line being decomposed with the appropriate tag. In this way, the advantages of the statistical engine with certain types of data are exploited and the advantages of the pattern engine with other types of data are also exploited.

It has generally been found that statistical engines are significantly better at detecting addresses in foreign languages, in particular far eastern languages such as Chinese and Japanese. This is because such addresses commonly do not have the same structure as western addresses, or even a common format pattern at all. Thus, it is difficult to establish a grammar that will consistently detect such addresses.

Accordingly, when it is intended to detect addresses in texts in far eastern languages, it is preferred to use a statistical engine trained using a corpus in the appropriate language and trained to output a token having the whole address as the lexeme with the token type Address. In this case, the grammar of the pattern engine 120 is adapted to recognise address tokens output by the statistical engine 110. For example, the parser 124 may have the grammar:
Contact: =PersonName JobTitle? OrgName? Address? E-mail? Phone_no? Fax_no?

In this case, the statistical engine 110 may be trained to output names, job titles and addresses, and the lexer 122 may be programmed to output e-mail addresses, and telephone and fax numbers. In the case of text input in a far eastern language, the combination engine will be able to detect full contact details, including the physical and e-mail addresses and the contact numbers, with significantly better accuracy than would be possible with either a statistical engine or a pattern engine separately.

In this embodiment, in which the statistical engine and the pattern engine are respectively trained and programmed to detect different types of data and output correspondingly different tokens for parsing, it has so far been assumed that the tokens output from the statistical engine and the lexer are adjacent in order for them to be linked in the grammar of the parser. As an example, assume that a pattern detection engine is programmed to recognise, as a name in front of an address, the pattern
name: =Capitalized_word Capitalized_word;
address: =name? number street_name zipcode etc. . . .
In this case, if the pattern engine is fed the sequence of characters:
Matt Mahon and Sarah Garcia
1701 Piedmont
Irvine, Calif. 92620
it would output the contact:
Sarah Garcia
1701 Piedmont
Irvine, Calif. 92620
In this case, only the name Sarah Garcia is associated with the address, and the name Matt Mahon has been erroneously omitted. When the pattern engine is used alone, this error arises from the vocabulary and grammar of the pattern detection method.

However, it is also possible to program the grammar of the pattern engine to associate more than one name with an address, for example by modifying the grammar to
name: =Capitalized_word Capitalized_word;
address: =name? ("and" name)? number street_name zipcode etc. . . .
In the above example, Matt Mahon and Sarah Garcia would both be correctly associated with the address. However, such a grammar could also trigger a large number of false positives. For example, the pattern engine would output the sequence of characters "BTW Address and Phone Number 12, place d'lena 75016 Paris" two people (eg Mr BTW Address and Ms Phone Number) associated with the address.

However, in the currently described modification, the parser 124 could maintain the grammar
name: =Capitalized_word Capitalized_word;
address: =name? ("and" name)? number street_name zipcode etc. . . .
In the Matt Mahon and Sarah Garcia example, the lexer 122 receives from the statistical engine 110 the series of characters and tokens:
(TOKEN <LEX Matt Mahon; TOKEN TYPE PersonName>) and (TOKEN <LEX Sarah Garcia; TOKEN TYPE PersonName>) 1701 Piedmont Irvine, Calif. 92620
and outputs the series of tokens:
StatLEX Matt Mahon; TYPE PersonName
LEX and; TYPE Miscellaneous
StatLEX Sarah Garcia; TYPE PersonName
LEX 16346 1701 Piedmont; TYPE Street
LEX Irvine; TYPE Town
LEX CA; TYPE State
LEX 92620; TYPE Postal-Code
Note that a distinction is made between tokens output by the statistical engine (StatLEX tokens or statistical engine tokens) and tokens output by the lexer (LEX tokens or lexer tokens), although this is not required in all embodiments. Here the parser 124 detects the names, street, town, state and postal code lexer tokens as a "name(s) before an address" pattern.

In the "BTW Address and Phone Number: 12, place d'lena 75016 Paris" example, the statistical engine 110 does not output "BTW Address" or "Phone Number" as name tokens and the error that would arise from using the pattern detection engine 120 alone is avoided.

In an alternative arrangement, the parser 124 checks the distance between the first token in an address and any preceding statistical engine name token. If there are one or more such statistical engine name tokens spaced apart a predetermined distance or less from the address, the grammar of the parser 124 associates the statistical engine name tokens with the address detected on the basis of the lexer tokens. In the present example, the distance threshold would be set as two lexer tokens or less. The statistical engine name token "Sarah Garcia" is not spaced apart from the lexer tokens making up the address and is therefore associated with the address. In addition, the statistical engine token "Matt Mahon" is spaced apart from the lexer tokens making up the physical address by the single lexer token "and". As this number (1) falls below the threshold, the name "Matt Mahon" is also associated with the address.

It is should be noted that this is a simple example of the general concept of this embodiment. As another example, it would also be possible to associate Chinese or other far eastern-language addresses detected by the statistical engine with phone numbers adjacent to or spaced a short distance apart from an address.

Figure 11:
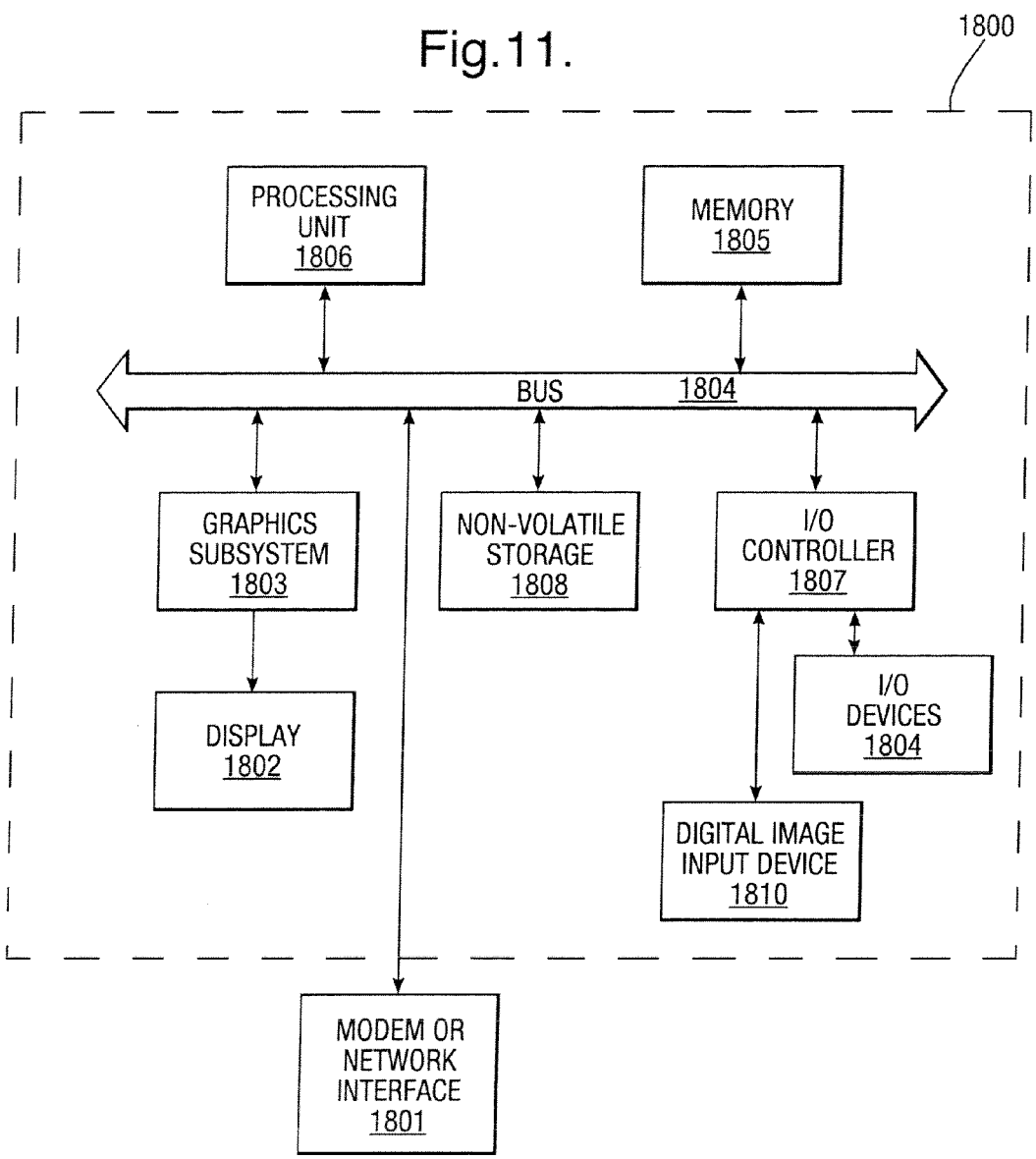
FIG. 11 is a schematic illustration of a computer system in which a combination engine according to an embodiment of the present invention may be realised.

FIG. 11 illustrates an exemplary embodiment of a computer system 1800 in which a combination engine of the present invention may be realised. Computer system 1800 may form part of a desktop computer, a laptop computer, a mobile phone, a PDA or any other device that processes text. It may be used as a client system, a server computer system, or as a web server system, or may perform many of the functions of an Internet service provider.

The computer system 1800 may interface to external systems through a modem or network interface 1801 such as an analog modem, ISDN modem, cable modem, token ring interface, or satellite transmission interface. As shown in FIG. 11 the computer system 1800 includes a processing unit 1806, which may be a conventional microprocessor, such as an Intel Pentium microprocessor, an Intel Core Duo microprocessor, or a Motorola Power PC microprocessor, which are known to one of ordinary skill in the computer art. System memory 1805 is coupled to the processing unit 1806 by a system bus 1804. System memory 1805 may be a DRAM, RAM, static RAM (SRAM) or any combination thereof. Bus 1804 couples processing unit 1806 to system memory 1805, to non-volatile storage 1808, to graphics subsystem 1803 and to input/output (I/O) controller 1807. Graphics subsystem 1803 controls a display device 1802, for example a cathode ray tube (CRT) or liquid crystal display, which may be part of the graphics subsystem 1803. The I/O devices may include one or more of a keyboard, disk drives, printers, a mouse, a touch screen and the like as known to one of ordinary skill in the computer art. A digital image input device 1810 may be a scanner or a digital camera, which is coupled to I/O controller 1807. The non-volatile storage 1808 may be a magnetic hard disk, an optical disk or another form for storage for large amounts of data. Some of this data is often written by a direct memory access process into the system memory 1806 during execution of the software in the computer system 1800.

In a preferred embodiment, the non-volatile storage 1808 stores a library of different statistical engines, which are trained using corpuses in different languages, and one or more pattern engines so that at least one pattern engine is suitable for use with each statistical engine. The computer system receives a sequence of characters in the form of an e-mail or other text over the modem or network interface 1801, or via the I/O controller 1807, for example from a disk inserted by the user or a document scanned by the scanner. The processor detects the language of the text and constructs the combination engine by retrieving the appropriate statistical engine and a corresponding pattern engine from the non-volatile storage 1808 and storing them in the computer memory 1805. Subsequently the processing unit 1806 uses the combination engine to scan the text and displays the output using the graphics subsystem 1803 and the display 1802. Preferably, the detected data is identified in the original text by highlighting it, displaying it in a different colour and/or font, or ringing it. The user may also be given an option to use the data, for example by storing it in an address book, using an e-mail address in a new e-mail, telephoning an identified phone number and so on.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

What is claimed is:

1. A machine-implemented method of detecting data of a plurality of types in a sequence of characters, the method comprising:

combining the use of a pattern detection method and a statistical learning method to detect the data, the statistical learning method converting the sequence of characters into a first sequence of tokens, each token comprising a lexeme and a token type relating to the function of the lexeme within the sequence of characters and having at least a predetermined probability that the corresponding data is of at least one of said types, the pattern detection method converting the sequence of characters into a second sequence of tokens, each token corresponding to data that matches a predetermined pattern indicative of the at least one of said types, the pattern detection method further parsing a combination of the first and second sequence of tokens;

comparing the first and second sequence of tokens, wherein when corresponding tokens from the first and second sequence of tokens for a portion of the sequence of characters are the same, parsing only one of the corresponding tokens, when the tokens are not name tokens and the corresponding tokens are different, parsing both corresponding tokens, and when the tokens are name tokens and the corresponding tokens are different, parsing the corresponding token only from the statistical learning method; and outputting the data corresponding to the combination of tokens as the data that matches the predetermined pattern.

2. The method of claim 1, wherein the at least one of said types is an address and the subset of types comprises at least one of a street, a town, a county, a state, a country and a postal code.

3. The method of claim 1, wherein each token in the first sequence of tokens further comprises a probability that the corresponding data is data of one of said types; and parsing only tokens having at least a predetermined probability using the pattern detection method.

4. The method of claim 1, wherein each token in the first sequence of tokens corresponds to data having at least a predetermined probability that the data is data of one of said types.

5. The method of claim 3 or claim 4, wherein the predetermined probability is 5%.

6. The method of claim 3 or claim 4, wherein the predetermined probability is low and the pattern detection method extracts the data from a correspondingly large number of the tokens in the first sequence of tokens.

7. The method of claim 3 or claim 4, wherein the predetermined probability is 80%.

8. The method of claim 3 or claim 4, wherein the predetermined probability is high and the pattern detection method removes tokens in the first sequence of tokens matching a predetermined pattern to extract the data.

9. The method of claim 3 or claim 4, wherein the pattern detection method outputs tokens corresponding to data that matched a predetermined pattern, each token having a token type indicating the type of data.

10. The method of claim 1, wherein the statistical learning method outputs tokens of a first token type and the pattern detection method outputs tokens of a second token type, and at least one of said plurality of types of data comprises at least a token of the first token type and a token of the second token type.

11. A machine-implemented method of processing data comprising:

receiving text;

processing the text using both a pattern engine and a statistical engine to detect data of a plurality of predetermined types, the statistical engine converting the text into a first sequence of tokens, each token comprising a lexeme and a token type relating to the function of the lexeme within the text and having at least a predetermined probability that the corresponding data is of at least one of the predetermined types, the pattern engine converting the text into a second sequence of tokens, each token corresponding to data that matches a predetermined pattern indicative of the at least one of the predetermined types, the pattern engine further parsing a combination of the first and second sequence of tokens; and comparing the first and second sequence of tokens, wherein when corresponding tokens from the first and second sequence of tokens for a portion of the text are the same, parsing only one of the corresponding tokens, when the tokens are not name tokens and the corresponding tokens are different, parsing both corresponding tokens, and when the tokens are name tokens and the corresponding tokens are different, parsing the corresponding token only from the statistical engine; and outputting the data corresponding to the combination of tokens as the data that matches the predetermined pattern.

12. The method of claim 11, wherein the at least one of the predetermined types is an address and the subset of types comprises at least one of a street, a town, a county, a state, a country and a postal code.

13. The method of claim 11, wherein each token in the first sequence of tokens further comprises a probability of the corresponding data being data of a said predetermined type; parsing only tokens that have at least a predetermined probability using the pattern engine.

14. The method of claim 11, wherein the statistical engine outputs tokens of a first token type and the pattern engine outputs tokens of a second token type, and at least one said predetermined types of data includes at least a token of the first token type and a token of the second token type.

15. An article of manufacture comprising:
a non-transitory computer readable storage medium including instructions that, when accessed by a machine, causes the machine to detect data of a plurality of types in an input sequence of characters by performing operations comprising:
combining the use of a pattern detection method and a statistical learning method to detect the data, the statistical learning method converting the sequence of characters into a first sequence of tokens, each token comprising a lexeme and a token type relating to the function of the lexeme within the sequence of characters and having at least a predetermined probability that the corresponding data is of at least one of the types, the pattern detection method converting the sequence of characters into a second sequence of tokens, each token corresponding to data that matches a predetermined pattern indicative of the at least one of the types, the pattern detection method further parsing a combination of the first and second sequence of tokens; and
comparing the first and second sequence of tokens, wherein when corresponding tokens from the first and second sequence of tokens for a portion of the sequence of characters are the same, parsing only one of the corresponding tokens, when the tokens are not name tokens and the corresponding tokens are different, parsing both corresponding tokens, and when the tokens are name tokens and the corresponding tokens are different, parsing the corresponding token only from the statistical learning method; and outputting the data corresponding to the combination of tokens as the data that matches the predetermined pattern.

16. An article of manufacture according to claim 15, wherein the article of manufacture stores a client application program that is being executed on a processor.

17. An article of manufacture comprising:
a non-transitory computer readable storage including data that, when accessed by a machine, causes the machine to perform operations comprising:
receiving text;
processing the text using both a pattern engine and a statistical engine to detect data of a plurality of predetermined types, the statistical engine converting the text into a first sequence of tokens, each token comprising a lexeme and a token type relating to the function of the lexeme within the text and having at least a predetermined probability that the corresponding data is of at least one of the predetermined types, the pattern engine converting the text into a second sequence of tokens, each token corresponding to data that matches a predetermined pattern indicative of the at least one of the predetermined types, the pattern engine further parsing a combination of the first and second sequence of tokens; and
comparing the first and second sequence of tokens, wherein when corresponding tokens from the first and second sequence of tokens for a portion of the text are the same, parsing only one of the corresponding tokens, when the tokens are not name tokens and the corresponding tokens are different, parsing both corresponding tokens, and when the tokens are name tokens and the corresponding tokens are different, parsing the corresponding token only from the statistical engine; and
outputting the data corresponding to the combination of tokens as the data that matches the predetermined pattern.

18. An article of manufacture according to claim 17, wherein the article of manufacture stores a client application program that is being executed on a processor.

19. An article of manufacture according to claim 17, wherein each token in the first sequence of tokens further comprises a probability that the corresponding data is data of one of said predetermined types and wherein the non-transitory computer readable storage medium further includes data that, when accessed by a machine, causes the machine to perform operations comprising:
parsing only tokens corresponding to data which has at least a predetermined probability of being data of a said predetermined type using the pattern engine.

20. An article of manufacture according to claim 17, wherein the non-transitory computer readable storage medium further includes data that, when accessed by a machine, causes the machine to perform operations comprising:
using the statistical engine to output tokens having a first token type and the pattern engine to output tokens having a second token type, wherein at least one of said plurality of types of data comprises at least a token of the first token type and a token of the second token type.

21. A data processing system, the system comprising:
an input for receiving text, the input coupled to a processor through a bus;
a pattern engine executing on the processor;

a statistical engine executing on the processor, wherein the pattern engine and the statistical engine together detect data of a plurality of predetermined types in the text, the statistical engine converting the text into a first sequence of tokens, each token comprising a lexeme and a token type relating to the function of the lexeme within the text and having a predetermined probability that the corresponding data is of at least one of the predetermined types, the pattern engine converting the text into a second sequence of tokens, each token corresponding to data that matchers a predetermined pattern indicative of the at least one of the predetermined types, the pattern engine further parsing a combination of the first and second sequence of tokens; and a comparison engine executing on the processor to compare the first and second sequence of tokens, wherein when corresponding tokens from the first and second sequence of tokens for a portion of the text are the same, parsing only one of the corresponding tokens, when the token are not name tokens and the corresponding tokens are different, parsing both corresponding tokens, and when the tokens are name tokens and the corresponding tokens are different, parsing the corresponding token only from the statistical engine; and an output for outputting the data corresponding to the combination of tokens as the data that matches the predetermined pattern, the output coupled to a processor through the bus.

22. The system according to claim 21, wherein the at least one of said predetermined types is an address and the subset of types comprises at least one of a street, a town, a county, a state, a country and a postal code.

23. The system according to claim 21, wherein each token in the first sequence of tokens further comprises a probability that the corresponding data is data of one of said predetermined types and the pattern engine parses only tokens corresponding to data which has at least a predetermined probability of being data of a said predetermined type.

24. The system according to claim 21, wherein:

the statistical engine outputs tokens of a first token type and the pattern engine comprises a lexer, which outputs tokens of a second token type;

wherein at least one of said predetermined types of data comprises at least a token of the first token type and a token of the second token type.

25. A data detecting system for detecting data of a plurality of types in text, the system comprising:

a pattern detection means;

a statistical engine means, wherein the pattern detection means and the statistical learning means are operative together to detect the data, the statistical engine means converting the text into a first sequence of tokens, each token comprising a lexeme and a token type relating to the function of the lexeme within the text and having at least a predetermined probability that the corresponding data is of at least one of said types, the pattern detection means converting the text into a second sequence of tokens, each token corresponding to data that matches a predetermined pattern indicative of the at least one of said types, the pattern detection means further parsing a combination of the first and second sequence of tokens; and a comparison means to compare the first and second sequence of tokens, wherein when corresponding tokens from the first and second sequence of tokens for a portion of the text are the same, parsing only one of the corresponding tokens, when the tokens are not name tokens and the corresponding tokens are different, parsing both corresponding tokens, and when the tokens are name tokens and the corresponding tokens are different, parsing the corresponding token only from the statistical engine means; and means for outputting the data corresponding to the combination of tokens as the data that matches the predetermined pattern.

26. The system of claim 25, wherein the at least one of the predetermined types is an address and the subset of types comprises at least one of a street, a town, a county, a state, a country and a postal code.

27. The system of claim 25, wherein the statistical engine means outputs tokens in combination with a probability that the corresponding data is data of one of said types;

the pattern detection means parses only tokens having at least a predetermined probability.

28. The system of claim 25, wherein the statistical learning means outputs tokens corresponding to data having at least a predetermined probability of being data of one of said types.

29. The system of claim 25, wherein the statistical engine means outputs tokens of a first token type, the pattern detection means outputs tokens of a second type and at least one of said predetermined types of data comprises at least a token of the first token type and a token of the second token type.

* * * * *